US012135517B2

(12) United States Patent
Samei et al.

(10) Patent No.: US 12,135,517 B2
(45) Date of Patent: Nov. 5, 2024

(54) HEATING DEVICE, NIP FORMING DEVICE, AND IMAGE FORMING APPARATUS

(71) Applicants: Masahiro Samei, Kanagawa (JP); Takayuki Andoh, Kanagawa (JP); Kota Shiodera, Tokyo (JP); Toshiyuki Kabata, Kanagawa (JP); Hiroshi Yoshinaga, Chiba (JP)

(72) Inventors: Masahiro Samei, Kanagawa (JP); Takayuki Andoh, Kanagawa (JP); Kota Shiodera, Tokyo (JP); Toshiyuki Kabata, Kanagawa (JP); Hiroshi Yoshinaga, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/185,778

(22) Filed: Mar. 17, 2023

(65) Prior Publication Data

US 2023/0324838 A1 Oct. 12, 2023

(30) Foreign Application Priority Data

Mar. 22, 2022 (JP) ................................ 2022-044879

(51) Int. Cl.
*G03G 15/20* (2006.01)

(52) U.S. Cl.
CPC ..... *G03G 15/2053* (2013.01); *G03G 15/2025* (2013.01)

(58) Field of Classification Search
CPC ........... G03G 15/2025; G03G 15/2053; G03G 2215/2035
See application file for complete search history.

(56) References Cited

U.S. PATENT DOCUMENTS

2007/0196152 A1 8/2007 Shimizu et al.
2009/0041515 A1 2/2009 Kim
2011/0044734 A1 2/2011 Shimokawa et al.
2011/0052245 A1 3/2011 Shinshi et al.
2011/0064437 A1 3/2011 Yamashina et al.
(Continued)

FOREIGN PATENT DOCUMENTS

EP 2469346 A2 6/2012
JP 2002-357968 12/2002
(Continued)

OTHER PUBLICATIONS

U.S. Appl. No. 18/162,872, filed Feb. 1, 2023, Hiroshi Yoshinaga, et al.

(Continued)

*Primary Examiner* — Sophia S Chen
(74) *Attorney, Agent, or Firm* — Harness, Dickey & Pierce, P.L.C.

(57) ABSTRACT

A heating device includes a rotator, a heater heating the rotator, a rotator holder holding a longitudinal end of the inner peripheral surface of the rotator, and lubricant applied to the rotator holder. The rotator holder includes a holding portion contacting the end of the inner peripheral surface, a flange portion contacting a longitudinal end of the rotator and extending outward in a radial direction of a loop of the rotator, and an inclined surface. The inclined surface is inclined in a direction away from an inner peripheral surface of the rotator from the holding portion toward the flange portion.

20 Claims, 16 Drawing Sheets

(56) References Cited

U.S. PATENT DOCUMENTS

| | | | | |
|---|---|---|---|---|
| 2011/0222875 | A1 | 9/2011 | Imada et al. | |
| 2011/0222888 | A1 | 9/2011 | Ikebuchi et al. | |
| 2011/0222931 | A1 | 9/2011 | Shinshi et al. | |
| 2011/0274453 | A1 | 11/2011 | Shimokawa et al. | |
| 2012/0177388 | A1 | 7/2012 | Imada et al. | |
| 2013/0045032 | A1 | 2/2013 | Shimokawa et al. | |
| 2013/0164056 | A1 | 6/2013 | Imada et al. | |
| 2013/0183072 | A1 | 7/2013 | Hase et al. | |
| 2013/0195523 | A1 | 8/2013 | Yamaji et al. | |
| 2013/0209147 | A1 | 8/2013 | Ogawa et al. | |
| 2014/0072355 | A1 | 3/2014 | Tamaki et al. | |
| 2014/0341623 | A1 | 11/2014 | Arai et al. | |
| 2014/0341627 | A1 | 11/2014 | Yoshikawa et al. | |
| 2017/0185015 | A1 | 6/2017 | Yoshinaga et al. | |
| 2018/0024462 | A1 | 1/2018 | Shimada et al. | |
| 2018/0259888 | A1* | 9/2018 | Mitsui ................ | G03G 15/2025 |
| 2018/0267449 | A1 | 9/2018 | Naitoh et al. | |
| 2018/0373187 | A1 | 12/2018 | Ikebuchi et al. | |
| 2020/0050144 | A1 | 2/2020 | Kabata et al. | |
| 2020/0209792 | A1* | 7/2020 | Saito .................. | G03G 15/2053 |
| 2022/0026834 | A1 | 1/2022 | Yoshinaga | |

FOREIGN PATENT DOCUMENTS

| | | |
|---|---|---|
| JP | 2005-292335 | 10/2005 |
| JP | 2007-072105 | 3/2007 |
| JP | 2013-164430 | 8/2013 |
| JP | 2013-164453 | 8/2013 |
| JP | 2014-056007 | 3/2014 |
| JP | 2014-056016 | 3/2014 |
| JP | 2014-240945 | 12/2014 |
| JP | 2019-008159 | 1/2019 |

OTHER PUBLICATIONS

U.S. Appl. No. 18/160,080, filed Jan. 26, 2023, Daisuke Inoue, et al.

U.S. Appl. No. 18/163,591, filed Feb. 2, 2023, Takayuki Andoh, et al.

Extended European Search Report, dated Jul. 12, 2023, issued in corresponding European Patent Application No. 23161000.7.

* cited by examiner

U.S. Application No. 18/185,778
Atty Dkt No. 6150-001929-US
Replacement Sheet

HEATING DEVICE, NIP FORMING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-044879, filed on Mar. 22, 2022, in the Japan Patent Office, the entire disclosure of which is hereby incorporated by reference herein.

BACKGROUND

Technical Field

Embodiments of the present disclosure generally relate to a heating device heating an inner peripheral surface of a rotator, a nip forming device including the heating device, and an image forming apparatus including the heating device.

Related Art

In image forming apparatuses such as a copier, a printer, a facsimile machine, and a multifunction peripheral of them, one type of image forming apparatus includes a fixing device employing a surf system or a belt system. The surf system or the belt system includes a rotator having a thin thickness. A heater such as a halogen heater heats the inner peripheral surface of the rotator. Rotator holders such as flanges support both ends of the inner peripheral surface of the rotator in a longitudinal direction of the rotator so that the inner peripheral surface of the rotator can slide on the rotator holders.

SUMMARY

This specification describes an improved heating device that includes a rotator, a heater, a rotator holder, and lubricant. The heater heats an inner peripheral surface of the rotator. The rotator holder holds an end of the inner peripheral surface of the rotator in a longitudinal direction of the rotator. The rotator holder includes a holding portion, a flange portion, and an inclined surface. The holding portion is in contact with the end of the inner peripheral surface of the rotator such that the end of the inner peripheral surface of the rotator is slidable on the holding portion. The flange portion is in contact with an end of the rotator in the longitudinal direction and extends outward in a radial direction of a loop of the rotator. The inclined surface is inclined in a direction away from the inner peripheral surface of the rotator facing the inclined surface from the holding portion toward the flange portion. The lubricant is in at least one of a liquid state or a semi-solid state and applied to the rotator holder.

This specification also describes an improved heating device that includes a rotator, a heater, a rotator holder, and lubricant. The heater heats an inner peripheral surface of the rotator. The rotator holder holds an end of the inner peripheral surface of the rotator in a longitudinal direction of the rotator. The rotator holder includes a first holding portion, a flange portion, an inclined surface, a circumferential annular groove, and a second holding portion. The first holding portion is in contact with the end of the inner peripheral surface of the rotator such that the end of the inner peripheral surface of the rotator is slidable on the holding portion. The flange portion is in contact with an end of the rotator in the longitudinal direction and extends outward in a radial direction of a loop of the rotator. The inclined surface inclines in a direction away from an inner peripheral surface of the rotator facing the inclined surface from the first holding portion toward the flange portion. The circumferential annular groove is formed inside the holding portion in the longitudinal direction. The second holding portion is formed inside the annular groove in the longitudinal direction. The second holding portion is adjacent to the inner peripheral surface of the rotator and not in contact with the inner peripheral surface of the rotator. The lubricant is in at least one of a liquid state or a semi-solid state and applied to the rotator holder.

This specification further describes an improved heating device that includes a rotator, a heater, a rotator holder, and lubricant. The heater heats an inner peripheral surface of the rotator. The rotator holder holds an end of the inner peripheral surface of the rotator in a longitudinal direction of the rotator. The rotator holder includes a first holding portion, a flange portion, a circumferential annular groove, and a second holding portion. The first holding portion is in contact with the end of the inner peripheral surface of the rotator such that the end of the inner peripheral surface of the rotator is slidable on the holding portion. The flange portion is in contact with an end of the rotator in the longitudinal direction and extends outward in a radial direction of a loop of the rotator. The circumferential annular groove is formed inside the first holding portion in the longitudinal direction. The second holding portion is formed inside the annular groove in the longitudinal direction. The second holding portion is adjacent to the inner peripheral surface of the rotator and not in contact with the inner peripheral surface of the rotator. The lubricant is in at least one of a liquid state or a semi-solid state and applied to the rotator holder.

This specification still further describes a nip forming device, a fixing device, and an image forming apparatus that include the heating device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
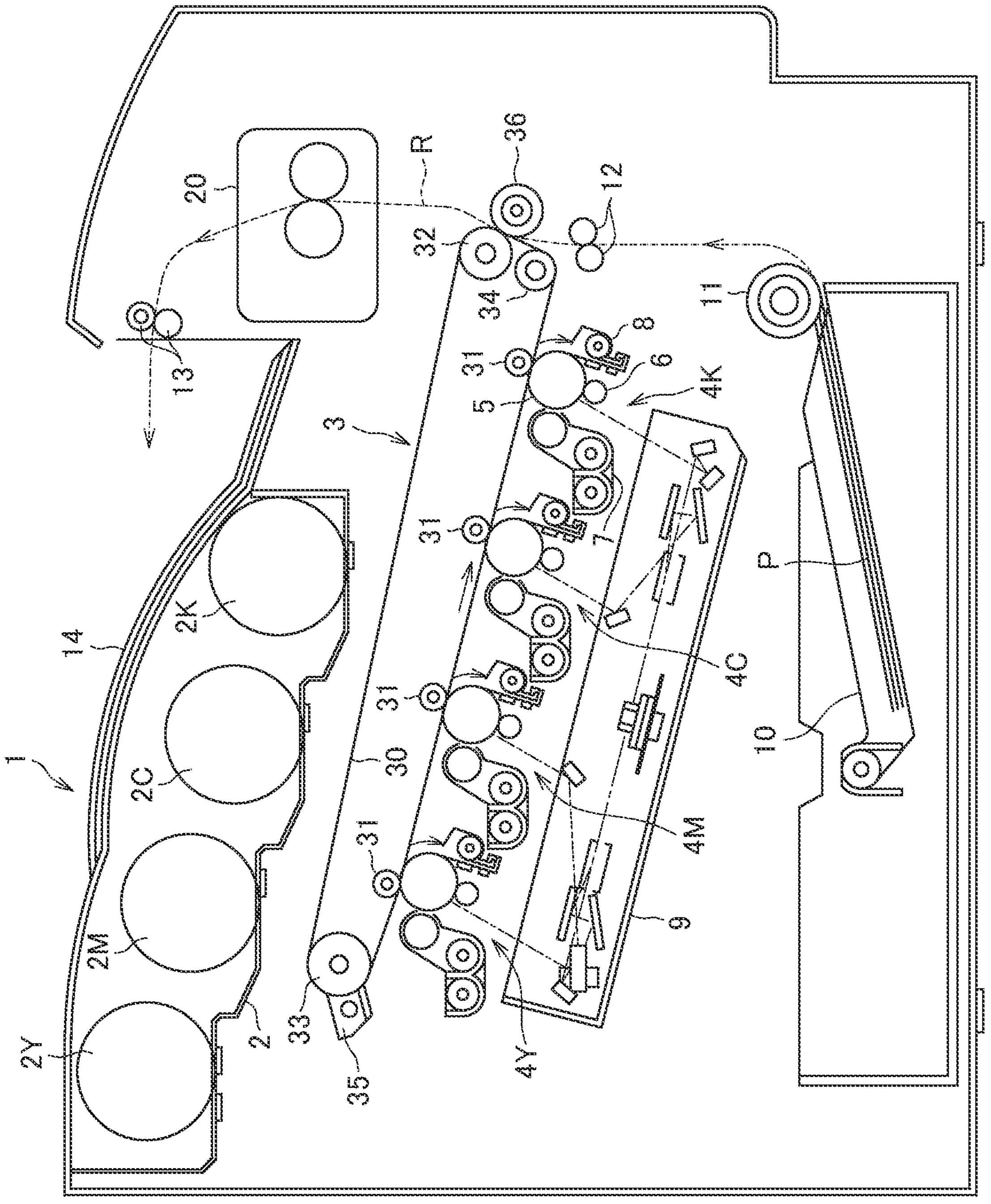
FIG. 1 is a schematic cross-sectional view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating the following embodiments, the same reference numbers are allocated to elements having the same function or shape, and redundant descriptions thereof are omitted below.

With reference to FIG. 1, the following describes a schematic configuration and operation of an image forming apparatus 1 including a fixing device 20 according to an embodiment of the present disclosure and next describes details of the fixing device 20.

FIG. 1 is a schematic view of the image forming apparatus 1. In the present embodiment, the image forming apparatus 1 is a color laser printer. The image forming apparatus 1 includes four image forming devices 4Y, 4M, 4C, and 4K in a center portion of a body of the image forming apparatus 1. The image forming devices 4Y, 4M, 4C, and 4K have substantially the same configuration except for containing different color developers (e.g., toners) of yellow (Y), magenta (M), cyan (C), and black (K), respectively, corresponding to color separation components of color images.

Specifically, each of the image forming devices 4Y, 4M, 4C, and 4K includes a photoconductor 5 that has a drum shape and serves as a latent image bearer, a charger 6 that charges the surface of the photoconductor 5, a developing device 7 that supplies toner to the surface of the photoconductor 5, and a cleaner 8 that cleans the surface of the photoconductor 5. FIG. 1 illustrates reference numerals assigned to the photoconductor 5, the charger 6, the developing device 7, and the cleaner 8 of the image forming device 4K that forms a black toner image. However, reference numerals for the image forming devices 4Y, 4C, and 4M that form yellow, cyan, and magenta toner images, respectively, are omitted for convenience.

An exposure device 9 is disposed below the image forming devices 4Y, 4M, 4C, and 4K and exposes the outer circumferential surfaces of the respective photoconductors 5 with laser beams. The exposure device 9 includes a light source, a polygon mirror, an f-θ lens, and a reflection mirror to irradiate the surface of the photoconductor 5 with the laser beam according to image data.

A transfer device 3 is disposed above the image forming devices 4Y, 4M, 4C, and 4K. The transfer device 3 includes an intermediate transfer belt 30 serving as an intermediate transferor and four primary transfer rollers 31 serving as primary transfer devices.

The transfer device 3 also includes a secondary transfer roller 36 as a secondary transfer device and a secondary transfer backup roller 32. In addition, the transfer device 3 includes a cleaning backup roller 33, a tension roller 34, and a belt cleaner 35.

The intermediate transfer belt 30 is an endless belt stretched taut across the secondary transfer backup roller 32, the cleaning backup roller 33, and the tension roller 34. In the present embodiment, as a driver drives and rotates the secondary transfer backup roller 32 in a counterclockwise direction, the intermediate transfer belt 30 rotates in a direction indicated by an arrow in FIG. 1 by friction therebetween.

The four primary transfer rollers 31 sandwich the intermediate transfer belt 30 together with the four photoconductors 5, forming four primary transfer nips between the intermediate transfer belt 30 and the photoconductors 5, respectively. Each primary transfer roller 31 is connected to a power supply. The power supply applies a predetermined direct current (DC) voltage and/or alternating current (AC) voltage to each of the primary transfer rollers 31.

The intermediate transfer belt 30 is interposed between the secondary transfer roller 36 and the secondary transfer backup roller 32 to form a secondary transfer nip. Similar to the primary transfer rollers 31, the secondary transfer roller 36 is connected to a power supply that applies a predetermined direct current (DC) voltage and/or alternating current (AC) voltage to the secondary transfer roller 36.

The belt cleaner 35 includes a cleaning brush and a cleaning blade that contact an outer circumferential surface of the intermediate transfer belt 30. A waste toner conveyance tube extends from the belt cleaner 35 to an inlet of a waste toner container to convey waste toner collected from the intermediate transfer belt 30 by the belt cleaner 35 to the waste toner container.

A bottle holder 2 disposed in an upper portion of the image forming apparatus 1 accommodates four toner bottles 2Y, 2C, 2M, and 2K detachably attached to the bottle holder 2. The toner bottles 2Y, 2C, 2M, and 2K contain fresh yellow, cyan, magenta, and black toners to be supplied to the developing devices 7 of the image forming devices 4Y, 4C, 4M, and 4K, respectively. The fresh toner is supplied from the toner bottles 2Y, 2M, 2C, and 2K to the respective developing devices 7 through toner supply tubes connected between the toner bottles 2Y, 2M, 2C, and 2K and the respective developing devices 7.

In a lower portion of the body of the image forming apparatus 1, a sheet feeding tray 10 and a sheet feeding roller 11 are disposed. The sheet feeding tray 10 contains sheets P as recording media. The sheet feeding roller 11 feeds the sheet P as a recording medium from the sheet feeding tray 10. The recording medium as a conveyed object that is the sheet P may be plain paper, thick paper, postcards, envelopes, thin paper, coated paper, art paper, tracing paper, overhead projector (OHP) transparencies, and the like. Additionally, the image forming apparatus may include a bypass feeder.

The image forming apparatus 1 includes a conveyance path R to convey the sheet P from the sheet feeding tray 10 to a sheet ejection roller pair 13 via the secondary transfer nip. The sheet ejection roller pair 13 ejects the sheet P outside the image forming apparatus 1. In the conveyance path R, a pair of timing rollers 12 is disposed upstream from the secondary transfer nip in a direction in which the sheet P is conveyed (hereinafter simply referred to as a sheet conveyance direction). The pair of timing rollers 12 sends out the sheet P fed from the sheet feeding roller 11 toward the secondary transfer nip at a predetermined time.

The fixing device 20 is disposed downstream from the secondary transfer roller 36 in the sheet conveyance direction. The fixing device 20 receives the sheet P bearing a toner image and fixes the toner image onto the sheet P. On the conveyance path R downstream from the fixing device 20 in the sheet conveyance direction, the sheet ejection roller pair 13 is disposed. The sheet ejection roller pair 13 ejects the sheet Ponto an output tray 14. To stack the sheet P ejected outside the image forming apparatus 1, the output tray 14 is disposed on a top surface of the image forming apparatus 1.

Next, a basic operation of the image forming apparatus 1 (illustrated as the laser printer) according to the present embodiment is described below with reference to FIG. 1. When an image forming operation is started, a driver drives and rotates the photoconductor 5 in each of the image forming devices 4Y, 4M, 4C, and 4K clockwise in FIG. 1, and the charger 6 uniformly charges the surface of the photoconductor 5 in a predetermined polarity.

The exposure device 9 emits laser beams onto the charged outer circumferential surfaces of the photoconductors 5, respectively, thus forming electrostatic latent images on the photoconductors 5. The image data used to expose the respective photoconductors 5 is monochrome image data produced by decomposing a desired full color image into yellow, cyan, magenta, and black image data. The developing devices 7 supply yellow, cyan, magenta, and black toners to the electrostatic latent images formed on the photoconductors 5, visualizing the electrostatic latent images as yellow, cyan, magenta, and black toner images, respectively.

Simultaneously, as the image forming operation is started, the secondary transfer backup roller 32 is driven and rotated counterclockwise in FIG. 1, rotating the intermediate transfer belt 30 in the direction indicated by the arrow in FIG. 1 by friction therebetween. The power supply applies a constant voltage or a constant-current control voltage having a polarity opposite the polarity of the toner to the primary transfer roller 31, creating a transfer electric field at each primary transfer nip formed between the photoconductor 5 and the primary transfer roller 31.

When the yellow, magenta, cyan, and black toner images formed on the photoconductors 5 reach the primary transfer nips, respectively, in accordance with rotation of the photoconductors 5, the transfer electric fields generated at the primary transfer nips transfer the yellow, magenta, cyan, and black toner images from the photoconductors 5 onto the intermediate transfer belt 30, respectively, such that the yellow, magenta, cyan, and black toner images are superimposed successively on the intermediate transfer belt 30. Thus, a full color toner image is formed on the outer circumferential surface of the intermediate transfer belt 30.

After the primary transfer of the yellow, cyan, magenta, and black toner images from the photoconductors 5 onto the intermediate transfer belt 30, residual toner that is not transferred onto the intermediate transfer belt 30 remains on each of the photoconductors 5. Each of the cleaners 8 removes the residual toner from each of the photoconductors 5. Thereafter, a discharger removes the charge on the outer circumferential surface of the photoconductor 5 to ready the photoconductor 5 for the next image formation.

On the other hand, the sheet feeding roller 11 disposed in the lower portion of the image forming apparatus 1 is driven and rotated to feed the sheet P from the sheet feeding tray 10 toward the pair of timing rollers 12 through the conveyance path R. When the sheet P comes into contact with the pair of timing rollers 12, the pair of timing rollers 12 temporarily stops conveying the sheet P.

Thereafter, the pair of timing rollers 12 is rotated at a predetermined time to convey the sheet P to the secondary transfer nip in synchronization with the full-color toner image formed on the intermediate transfer belt 30 reaching the secondary transfer nip. The power supply applies a transfer voltage to the secondary transfer roller 36. The transfer voltage has the polarity opposite the polarity of the charged toner contained in the full-color toner image formed on the intermediate transfer belt 30. As a result, a transfer electric field is generated at the secondary transfer nip.

The transfer electrical field transfers the full-color toner image from the intermediate transfer belt 30 onto the sheet P at a time. After the secondary transfer of the full color toner image from the intermediate transfer belt 30 onto the sheet P, residual toner that is not transferred to the sheet P remains on the intermediate transfer belt 30. The belt cleaner 35 removes the residual toner from the intermediate transfer belt 30. The removed toner is conveyed and collected into the waste toner container disposed inside the image forming apparatus 1.

Thereafter, the sheet P bearing the full color toner image is conveyed to the fixing device 20 that fixes the full color toner image onto the sheet P. The sheet P bearing the fixed full-color toner image is ejected by the sheet ejection roller pair 13 onto the outside of the image forming apparatus 1 and is stacked on the output tray 14.

The above describes the image forming operation of the image forming apparatus 1 to form the full-color toner image on the sheet P. Alternatively, the image forming apparatus 1 may form a monochrome toner image by using any one of the four image forming devices 4Y, 4C, 4M, and 4K or may form a bicolor toner image or a tricolor toner image by using two or three of the image forming devices 4Y, 4C, 4M, and 4K.

Figure 2A:
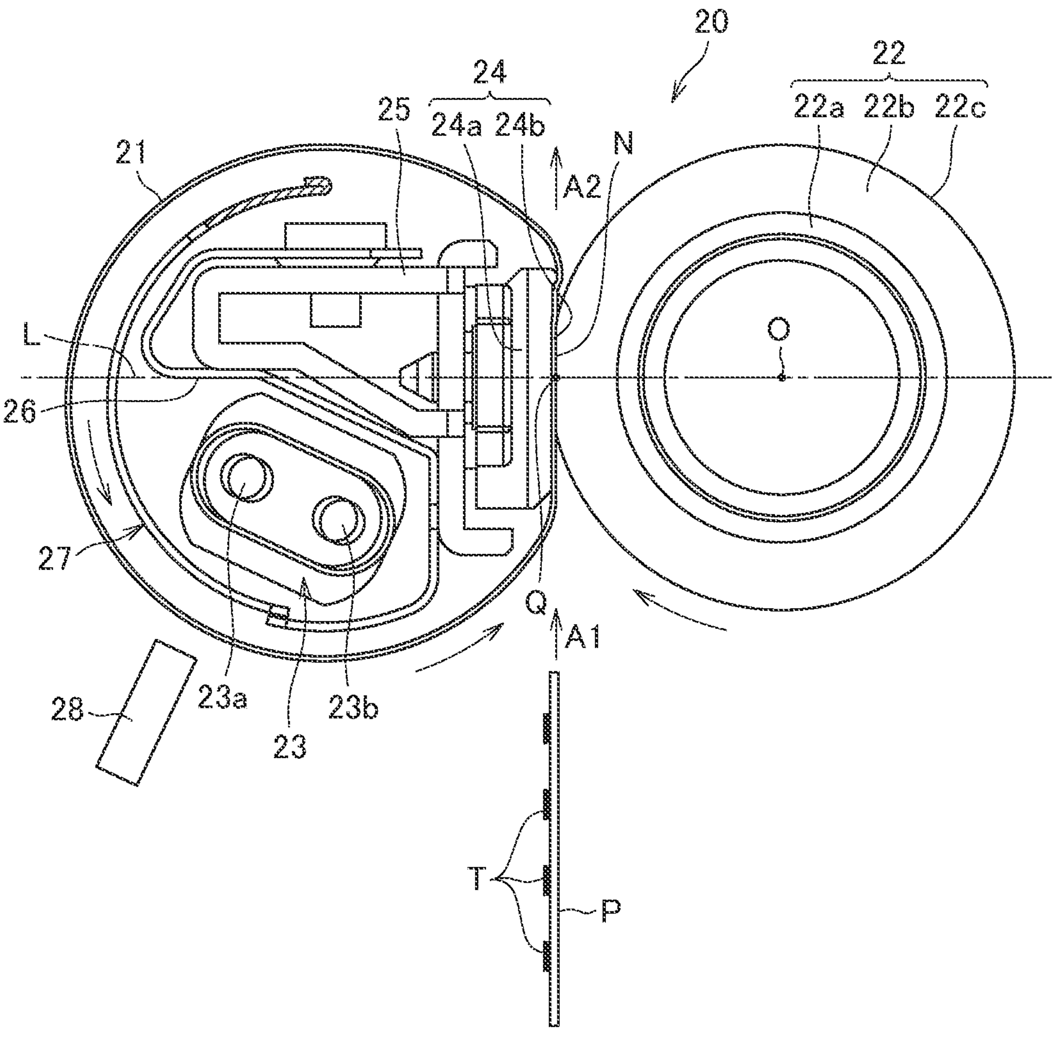
FIG. 2A is a schematic cross-sectional view of a fixing device including a shield that is moved to a light-shielding position.
Figure 2B:
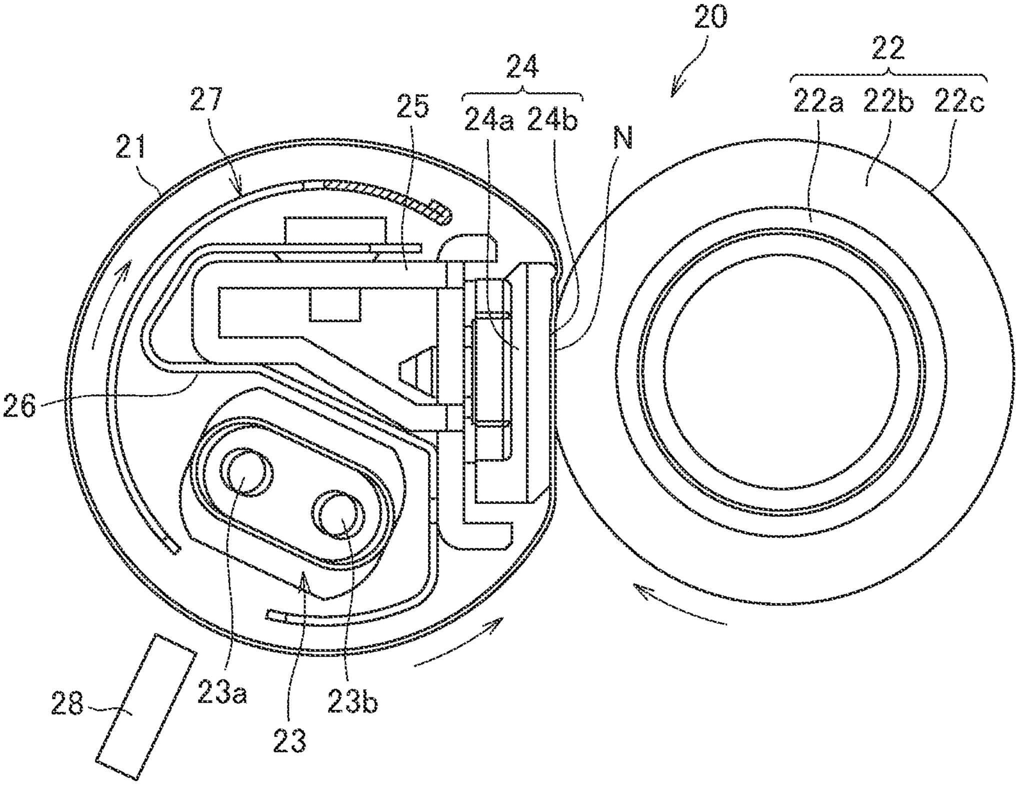
FIG. 2B is a schematic cross-sectional view of the fixing device including the shield that is moved to a retracted position.

With reference to FIGS. 2A and 2B, the following describes the fixing device 20. FIGS. 2A and 2B are schematic cross-sectional views of the fixing device 20. The fixing device 20 is one example of a nip forming device.

The fixing device 20 includes a fixing belt 21 as a rotator and a pressure roller 22 as an opposed rotator in contact with the outer peripheral surface of the fixing belt 21.

The fixing device 20 also includes a halogen heater 23, a nip formation pad 24, a stay 25, a reflector 26, a shield 27, and a temperature sensor 28. The halogen heater serves as a heat source to heat the fixing belt 21. The nip formation pad 24 is in contact with the inner peripheral surface of the fixing belt 21. The pressure roller 22 as a pressure rotator presses against the nip formation pad 24 via the fixing belt 21 to form a fixing nip N. The stay 25 supports the nip formation pad 24. The halogen heater 23 radiates radiant heat, and the reflector 26 reflects the radiant heat to the fixing belt 21. The shield 27 shields the radiant heat radiated from the halogen heater 23. The temperature sensor 28 serves as a temperature detector to detect the temperature of the fixing belt 21.

The fixing belt 21 is a thin, flexible, endless belt (which may be a film). Specifically, the fixing belt 21 includes a base layer forming the inner peripheral surface of the fixing belt 21. The base layer is made of metal such as nickel or steel use stainless (SUS) or resin such as polyimide (PI).

The fixing belt 21 includes a release layer made of tetrafluoroethylene-perfluoroalkylvinylether copolymer (PFA), polytetrafluoroethylene (PTFE) or the like. The release layer is the outermost layer. Optionally, an elastic layer made of rubber such as silicone rubber, silicone rubber foam, or fluoro rubber may be interposed between the base layer and the release layer.

The fixing belt 21 not including the elastic layer has a small thermal capacity that improves a fixing property. However, as the pressure roller 22 and the fixing belt 21 sandwich and press the unfixed toner image T on the sheet P passing through the fixing nip N, slight surface asperities of the fixing belt 21 may be transferred onto the toner image T on the sheet P, resulting uneven gloss of the solid toner image T. To address this circumstance, preferably, the fixing belt 21 includes the elastic layer no thinner than 80 μm. The elastic layer not thinner than 80 μm elastically deforms to absorb the slight surface asperities in the fixing belt 21, thus preventing uneven gloss of the toner image on the sheet P.

In order to decrease the thermal capacity of the fixing belt 21, the fixing belt 21 in the present embodiment is thin and has a decreased loop diameter. For example, the base layer of the fixing belt 21 is designed to have a thickness of from 20 μm to 50 μm, the elastic layer is designed to have a thickness of from 80 μm to 300 μm, and the release layer is designed to have a thickness of from 3 μm to 50 μm. Thus, the fixing belt 21 is designed to have a total thickness not greater than 1 mm.

The loop diameter of the fixing belt 21 is set in a range of 20 mm to 40 mm. In order to further decrease the thermal capacity of the fixing belt 21, preferably, the fixing belt 21 may have a total thickness not greater than 0.20 mm and more preferably not greater than 0.16 mm. Preferably, the loop diameter of the fixing belt 21 may be 30 mm or less.

The pressure roller 22 includes a cored bar 22*a*, an elastic layer 22*b* disposed on the surface of the cored bar 22*a*, and a release layer 22*c* disposed on the surface of the elastic layer 22*b*. The elastic layer 22*b* is made of foamed silicone rubber, silicon rubber, or fluoro-rubber. The release layer 22*c* is made of PFA or PTFE. The pressurization assembly including a spring presses the pressure roller 22 against the nip formation pad 24 via the fixing belt 21. Thus, the pressure roller 22 abuts on the nip formation pad 24 via the fixing belt 21. At a portion at which the pressure roller 22 contacts and presses the fixing belt 21, deformation of the elastic layer 22*b* of the pressure roller 22 forms the fixing nip N having a predetermined width in the sheet conveyance direction.

A driver such as a motor disposed inside the image forming apparatus 1 drives and rotates the pressure roller 22. As the driver drives and rotates the pressure roller 22, a driving force of the driver is transmitted from the pressure roller 22 to the fixing belt 21 at the fixing nip N, thus rotating the fixing belt 21 in accordance with rotation of the pressure roller 22 by friction between the fixing belt 21 and the pressure roller 22. As described later with reference to FIG. 3, flanges 40 as rotator holders are inserted into both ends of the fixing belt 21 to rotatably hold the fixing belt 21. However, in the fixing nip N, the flanges 40 do not support both ends of the fixing belt 21.

In the present embodiment, the pressure roller 22 is a solid roller. Alternatively, the pressure roller 22 may be a hollow roller. In a case in which the pressure roller 22 is the hollow roller, a heat source such as the halogen heater may be disposed inside the pressure roller 22.

The elastic layer 22*b* of the pressure roller 22 may be made of solid rubber. Alternatively, if no heater is disposed inside the pressure roller 22, the elastic layer of the pressure roller 22 may be made of sponge rubber. The sponge rubber is preferable to the solid rubber because the sponge rubber has enhanced thermal insulation that draws less heat from the fixing belt 21.

The halogen heater 23 is disposed inside the loop of the fixing belt 21 and upstream from the fixing nip N in the sheet conveyance direction. Specifically, as illustrated in FIG. 2A, the halogen heater 23 is disposed, in the sheet conveyance direction, upstream from an imaginary line L passing through the center Q of the fixing nip N in the sheet conveyance direction and the rotation center O of the pressure roller 22, that is, in a lower portion from the line L in FIG. 2A.

The power source situated inside the image forming apparatus 1 supplies power to the halogen heater 23 so that the halogen heater 23 generates heat. Output of the power source is controlled based on the temperature of the outer peripheral surface of the fixing belt 21 detected by the temperature sensor 28.

Such heating control of the halogen heater 23 adjusts the temperature of the fixing belt 21 to a desired fixing temperature. Instead of the temperature sensor 28 that detects the temperature of the fixing belt 21, a temperature sensor that detects the temperature of the pressure roller 22 may be disposed, and the controller may predict the temperature of the fixing belt 21 based on the temperature of the pressure roller 22 detected by the temperature sensor.

In the present embodiment, two halogen heaters 23*a* and 23*b* are disposed in the loop of the fixing belt 21, but one halogen heater 23 or three or more halogen heaters 23 may be disposed in the loop of the fixing belt 21 based on the size of the sheet P used in the image forming apparatus 1. However, when the cost of the halogen heater 23 itself, a space inside the loop of the fixing belt 21, and the like are considered, a desirable number of the halogen heaters 23 (e.g., 23*a* and 23*b*) is two or less. The radiant heat radiated from the heater heats the fixing belt 21. The heater may be a resistive heat generator or carbon heater instead of the halogen heater.

The nip formation pad 24 includes a base pad 24*a* and a sliding sheet 24*b* disposed on the surface of the base pad 24*a*, the surface facing the fixing belt 21. The sliding sheet 24*b* is a low friction member. The base pad 24*a* extends in the axial direction of the fixing belt 21 or the axial direction of the pressure roller 22.

The base pad 24*a* receives a pressing force from the pressure roller 22 and determines a shape of the fixing nip N. In the present embodiment, the shape of the fixing nip N is a flat shape but may be a concave shape or another shape.

The sliding sheet 24*b* is disposed to reduce sliding friction when the fixing belt 21 rotates. The base pad 24*a* itself made of a low-friction member enables a configuration not including the sliding sheet 24*b*.

The base pad 24*a* is made of a heat-resistant material having a heat-resistant temperature of 200° C. or more to prevent deformation of the nip formation pad 24 due to heat in the toner fixing temperature range, thereby ensuring a stable state of the fixing nip N and stabilizing qualities in the image on the ejected sheet P. The material of the base pad 24*a* may be general heat-resistant resins such as polyethersulfone (PES), polyphenylene sulfide (PPS), liquid crystal polymer (LCP), polyethernitrile (PEN), polyamide-imide (PAI), and polyetheretherketone (PEEK).

The stay 25 supports and fixes the base pad 24*a*. The stay 25 prevents the nip formation pad 24 from being bent by the pressure from the pressure roller 22 to form the fixing nip having a uniform width along the axial direction of the pressure roller 22.

Preferably, the stay 25 is made of metal having an increased mechanical strength, such as stainless steel or iron, to prevent bending of the nip formation pad 24. The base pad 24*a* is preferably made of a rigid material to ensure the strength of the base pad 24*a*. The material of the base pad 24*a* may be resins such as liquid crystal polymers (LCP), metals, ceramics, or the like.

The reflector 26 is fixed and supported by the stay 25 so as to face the halogen heater 23. The reflector 26 reflects the radiant heat and light emitted from the halogen heater 23 toward the fixing belt 21 to prevent the heat from being transmitted to the stay 25 and the like, thereby efficiently heating the fixing belt 21 and saving energy.

The material of the reflector 26 may be aluminum, stainless steel, or the like. In particular, the reflector made of an aluminum base on which silver having low emissivity (in other words, high reflectivity) is evaporated improves the heating efficiency of the fixing belt 21.

A surface of the reflector 26 facing the halogen heater 23 is formed to spread over the inner peripheral surface of the fixing belt 21. As illustrated in FIG. 2A. the reflector 26 has a portion facing a lower portion of the halogen heater 23 and extending along a circumferential direction of the fixing belt 21 to shield radiant heat radiated from both ends of the halogen heater 23. The above-described portion of the reflector 26 does not extend over the entire length of the reflector 26 in the longitudinal direction of the reflector 26.

The shield 27 is made of a metal plate such as a SUS plate having heat resistance and a thickness of 0.1 mm to 1.0 mm so as to have a cross-sectional shape along the inner peripheral surface of the fixing belt 21. In FIGS. 2A and 2B, the cross-sectional shape of the shield 27 has ends and is not a ring closed in the circumferential direction. Specifically, the cross-sectional shape of the shield 27 is an arc.

The shield 27 is rotatable around the halogen heater 23. In the present embodiment, the shield 27 is rotatable along the circumferential direction of the fixing belt 21. Specifically, a circumferential region of the fixing belt 21 has a directly heated region directly facing the halogen heater 23 and heated by the halogen heater 23. In addition, the circumferential region of the fixing belt 21 has a non-directly heated region in which a member other than the shield 27, such as the reflector 26, the stay 25, or the nip formation pad 24 exists between the halogen heater 23 and the fixing belt 21.

When the shield 27 thermally shields between the halogen heater 23 and the fixing belt 21, the shield 27 is disposed at a shielding position facing the directly heated region as illustrated in FIG. 2A. When the shield 27 does not thermally shield between the halogen heater 23 and the fixing belt 21, the shield 27 is moved to a retracted position facing the non-directly heated region as illustrated in FIG. 2B.

In other words, the shield 27 is retracted to a space above upper portions of the reflector 26 and the stay 25. The shield 27 is preferably made of ceramic or metal such as aluminum, iron, or SUS because the shield 27 requires heat resistance.

Figure 3:
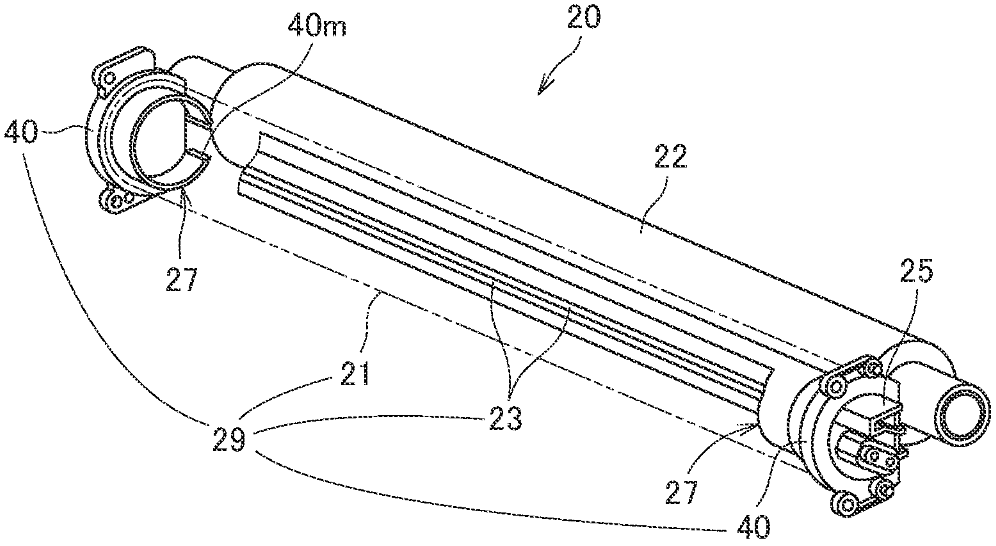
FIG. 3 is a perspective view of a part of the fixing device of FIGS. 2A and 2B.

FIG. 3 is a perspective view of a part of the fixing device 20 according to the present embodiment. As illustrated in FIG. 3, the flanges 40 as rotator holders are inserted into both ends of the fixing belt 21, respectively.

The flanges 40 come into contact with both ends of the inner peripheral surface of the fixing belt 21 in a longitudinal direction of the fixing belt 21, respectively, and both ends of the inner peripheral surface of the fixing belt 21 slide on the flanges 40. As a result, the flanges 40 rotatably hold the fixing belt 21. The fixing device 20 includes a pair of side plates that supports and fixes the flanges 40, the halogen heater 23, and the stay 25. The flange 40 has a cylindrical portion with a notch 40*m*. The notch 40*m* faces the pressure roller 22 so that the flange 40 does not interfere with the pressure roller 22. Thus, the cylindrical portion of the flange 40 has a C-shape.

With continued reference to FIGS. 2A and 2B, the following describes a fixing operation of the fixing device 20 according to the present embodiment. As the image forming apparatus 1 illustrated in FIG. 1 is powered on, power is supplied to the halogen heater 23, and the driver starts driving and rotating the pressure roller 22 clockwise in FIGS. 2A and 2B. The rotation of the pressure roller 22 drives the fixing belt 21 to rotate counterclockwise in FIGS. 2A and 2B by friction between the fixing belt 21 and the pressure roller 22.

Thereafter, the sheet P bearing the unfixed toner image T formed in the image forming processes described above is conveyed in the sheet conveyance direction A1 in FIG. 2A while guided by a guide plate and enters the fixing nip N formed between the fixing belt 21 and the pressure roller 22 pressed against the fixing belt 21. The toner image T is fixed onto the sheet P under heat from the fixing belt 21 heated by the halogen heater 23 and pressure exerted between the fixing belt 21 and the pressure roller 22.

The sheet P bearing the fixed toner image Tis sent out from the fixing nip N and conveyed in a direction indicated by an arrow A2 in FIG. 2A. As a leading edge of the sheet P contacts a front edge of the separator, the separator separates the sheet P from the fixing belt 21. The sheet P separated from the fixing belt 21 is ejected by the sheet ejection roller pair 13 depicted in FIG. 1 to the outside of the image forming apparatus 1 and stacked on the output tray 14.

Lubricant is applied and interposed between the fixing belt 21 as the rotator and the flange 40 as the rotator holder in order to reduce frictional resistance and prevent the occurrence of abnormal noise. The lubricant is a liquid or semi-solid substance that have lubricity.

The following describes the image forming apparatus including the fixing device according to a comparative embodiment.

When the temperature of the flange 40 becomes high, the flange 40 heats the lubricant, which generates fine particles and ultrafine particles from volatile substances included in the lubricant. The fine particles and ultrafine particles may leak to the outside of the image forming apparatus 1.

Recently, Reducing the fine particles in addition to the volatile organic compounds (VOC) is requested from the viewpoint of environmental protection. In particular, environmental standards such as Blue Angel in Germany regulates an upper limit value of fine particles having a diameter of 1 μm or less and being discharged from the apparatus.

In the comparative embodiment, a configuration has been adopted in which the lubricant between the rotator holder such as the flange and the fixing belt as the rotator is moved inward in the longitudinal direction of the fixing belt so as not to leak the lubricant to the outside.

Figure 6A:
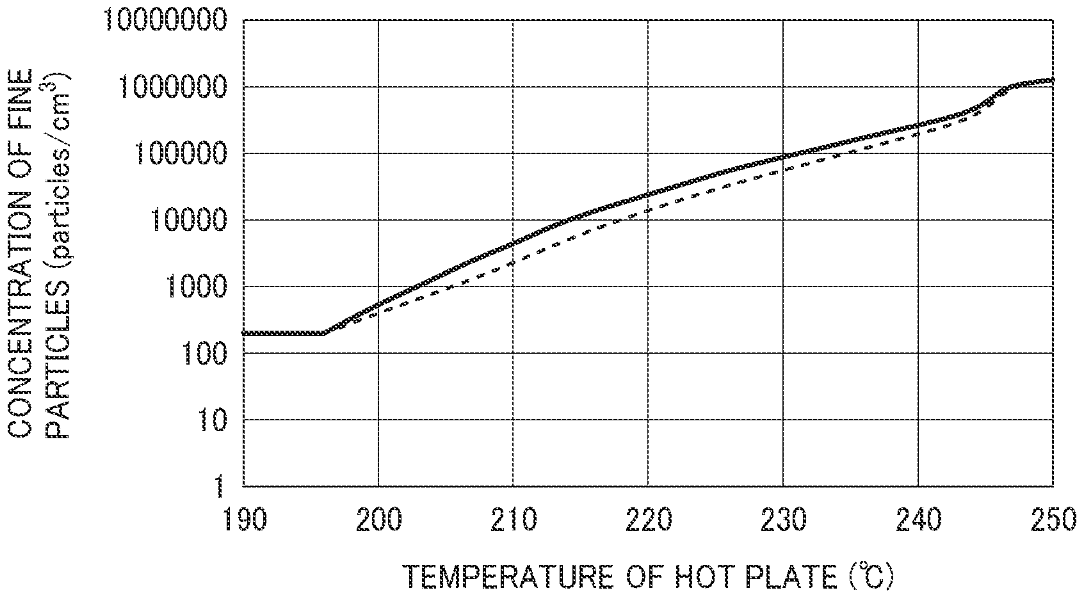
FIG. 6A is a graph illustrating a relation between temperature of a hot plate and a number concentration of fine particles.

However, a heater such as the halogen heater is inside the loop of the fixing belt. The lubricant moved toward the center of the fixing belt approaches the heater and may be exposed to a high temperature. FIG. 6A is a graph illustrating results of experiments. In the experiments, the lubricant was heated by a hot plate, and concentrations of generated fine particles were measured in temperatures from 190° C. to 250° C. From the results of the experiments, it can be seen that the fine particles start to come out all at once at 200° C. or more.

The graph of FIG. 6A illustrates a relation between the temperature rise of silicone oil and fluorine grease used as the lubricant and the concentration of fine particles generated from the lubricant (specifically, the number of fine particles including ultrafine particles (FP/UFP) generated per 1 cm3). The fine particles in this specification are fine particles and ultrafine particles that can be measured by the measurement method and under the measurement conditions in the following test, and the particle diameter is preferably in a range from 5.6 nm to 560 nm.

In the experiments, a liquid or semi-solid lubricating substance in a sample container was heated in a chamber of 1 m3 (with a ventilating frequency of 5 times) in accordance with Japanese Industrial Standards (JIS) A 1901. An aluminum plate of 50 mm×50 mm×5 mm provided with a recess having a diameter of 22 mm and a depth of 2 mm was used as a sample container. A sample was disposed in the recess. The sample container on which the sample was placed on a hot plate of a heating device (Clean Hot Plate MH-180CS manufactured by AS ONE Corporation, Controller MH-3CS manufactured by AS ONE Corporation). The sample was heated at a preset temperature of 250° C. While the temperature of the hot plate was monitored, the number concentration of FP/UFP in the chamber was measured with a measuring device (FAST MOBILITY PARTICLE SIZER (FMPS) Model 3091 manufactured by TSI Incorporated), with the Use Averaging Interval at Export of 30 seconds. Fluorine grease and silicone oil were used as lubricants with a sample amount of 36 microliters (μl). In FIG. 6A, the solid line indicates the number concentration of FP/UFP generated from the fluorine grease, whereas the alternate long and short dash line indicates the number concentration of FP/UFP generated from the silicone oil. In FIG. 6A, the horizontal axis indicates the temperature of the hot plate. Since the temperature rise of the hot plate and the temperature rise of the lubricant change substantially in synchronization with each other, the temperature of the hot plate is regarded as the temperature of the lubricant here.

Figure 6B:
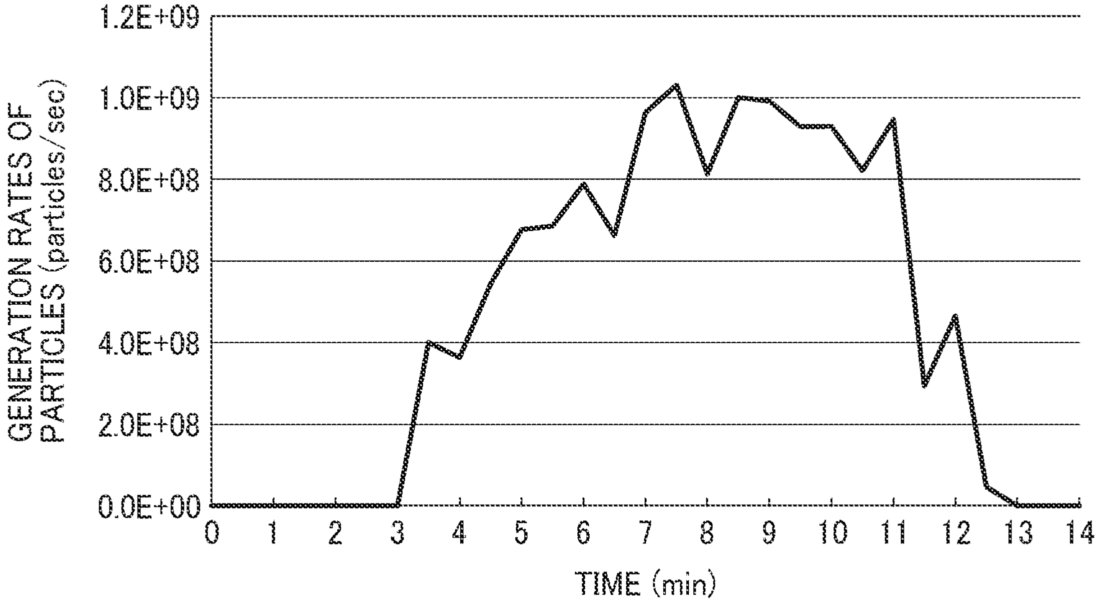
FIG. 6B is a graph illustrating a relation between the operating time of a fixing device according to a comparative embodiment and a generation rate of fine particles.
Figure 6C:
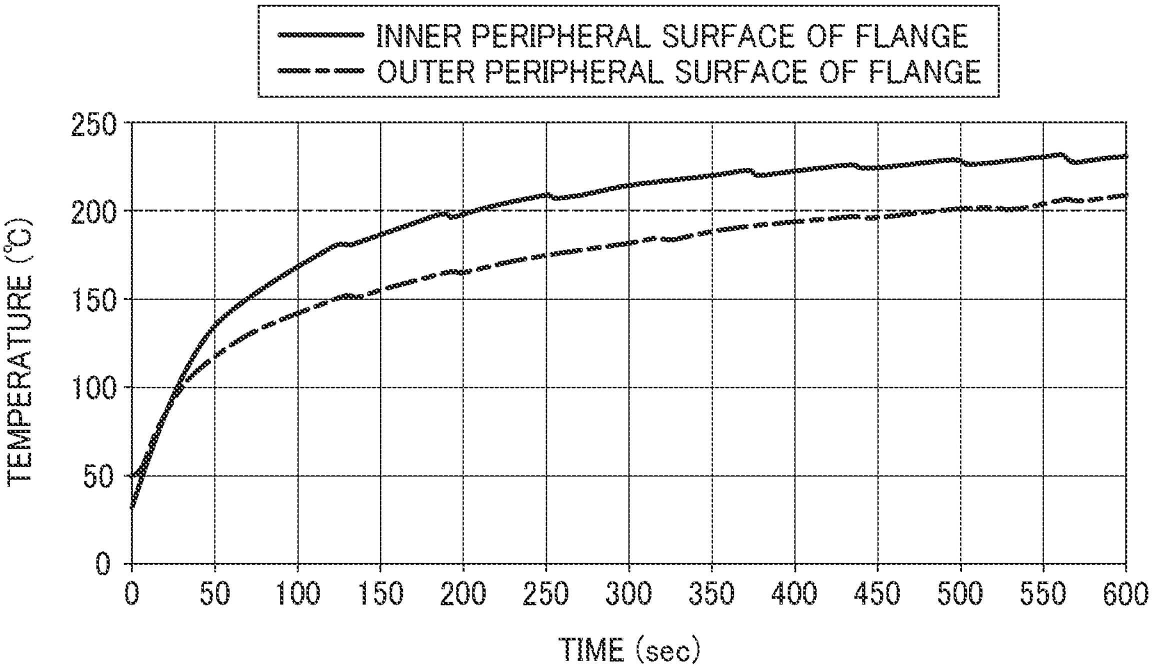
FIG. 6C is a graph illustrating a relation between an operating time of the fixing device according to the comparative embodiment and the temperature of the inner peripheral surface of the flange and a relation between the operating time and the temperature of the outer peripheral surface of the flange.

On the other hand, the present inventors used the image forming apparatus including the fixing device according to the comparative embodiment and performed a continuous printing test for ten minutes to measure the number of fine particles (particles/see) generated in the printing test. FIG. 6B is a graph illustrating the measured results. During the printing test, temperatures were measured in the inner peripheral surface and the outer peripheral surface of the flange of the fixing device. FIG. 6C is a graph illustrating measurement results. In FIG. 6B, the timing at which the fine particles rapidly increase is about 3 minutes from the start of printing. This timing substantially coincides with the time at which the inner peripheral surface of the flange illustrated in FIG. 6C reaches 200° C. or more. Based on the above-described results, the present inventors found that the inner peripheral surface of the flange is the place in which the fine particles are generated. The outer peripheral surface of the flange also reaches 200° C. in about 9 minutes, but before that, fine particles have already been generated.

Figure 7A:
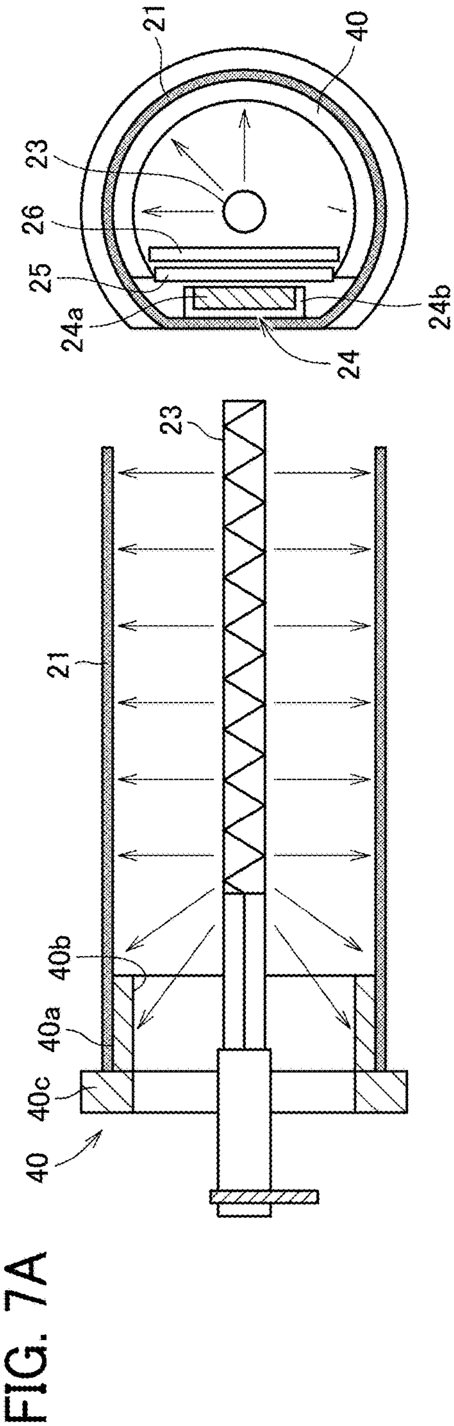
FIG. 7A is a front cross-sectional view and a side cross-sectional view of the fixing device of the comparative embodiment not including a shield.
Figure 7B:
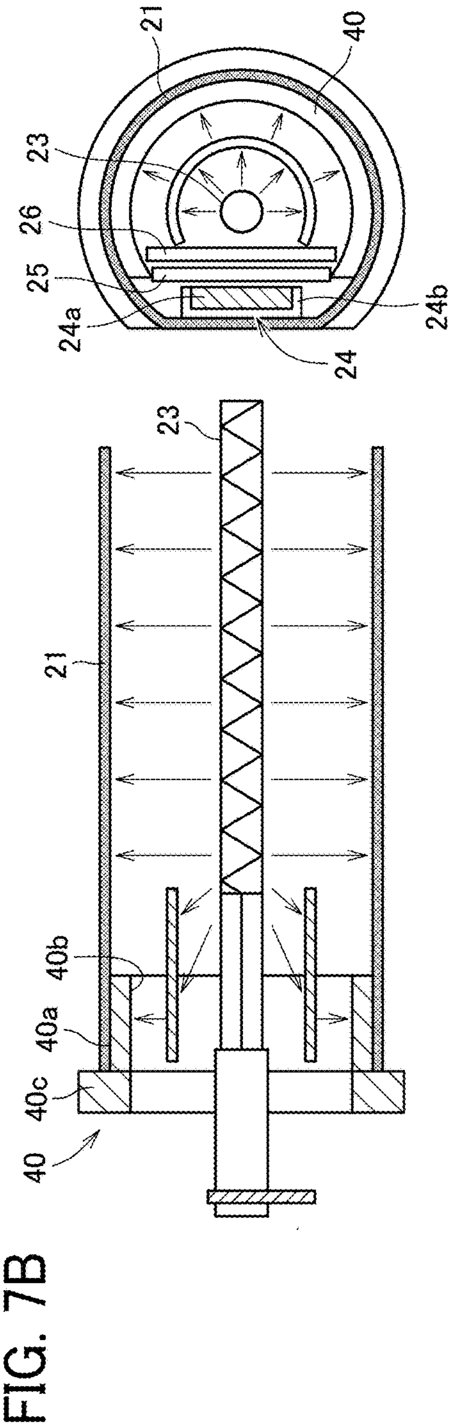
FIG. 7B is a front cross-sectional view and a side cross-sectional view of the fixing device of the comparative embodiment including a shield.
Figure 7C:
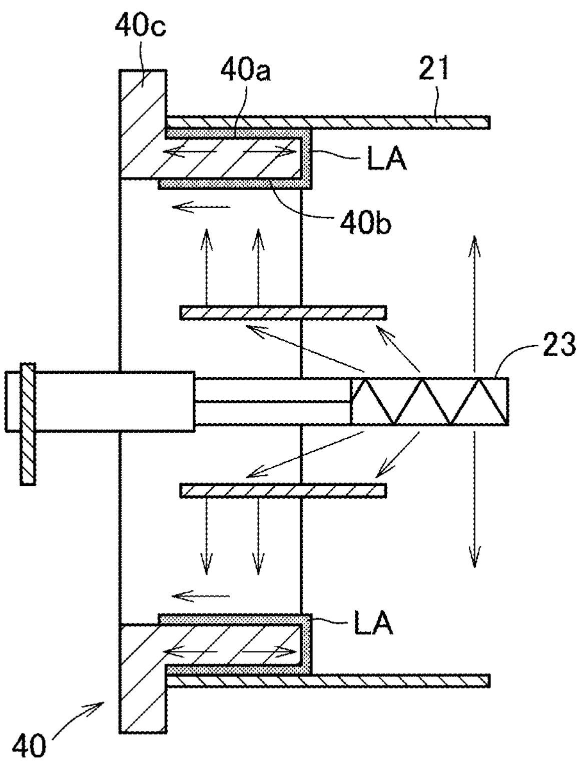
FIG. 7C is a partial cross-sectional view of the fixing device of FIG. 7A.

FIGS. 7A to 7C are views of a part of the fixing device to illustrate a flange 40 with the inner peripheral surface of the flange 40 heated by radiant heat from the halogen heater 23. In FIG. 7A, the radiant heat from the halogen heater 23 directly acts on the inner peripheral surface of the flange 40. The fixing device illustrated in FIGS. 7B and 7C includes a shield plate to shield the radiant heat, but the heated shield plate heats the inner peripheral surface of the flange 40 as illustrated in FIGS. 7B and 7C. As a result, as illustrated in FIG. 7C, the lubricant flows on the inner peripheral surface of the flange 40 as illustrated by light black portions in FIG. 7C and is heated to generate the fine particles.

Next, the flange 40 in a heating device 29 according to the present disclosure is described below.

The heating device 29 according to the present embodiments includes the fixing belt 21, the halogen heater 23, and the flanges 40 as illustrated in FIG. 3. The flanges 40 may be made of a heat-resistant resin such as liquid crystal polymer. The following describes the flanges 40 according to a first embodiment to a fifth embodiment. It goes without saying that these embodiments are examples and do not limit the present disclosure.

The first embodiment is described below with reference to FIGS. 4A and 4B.

Figure 4A:
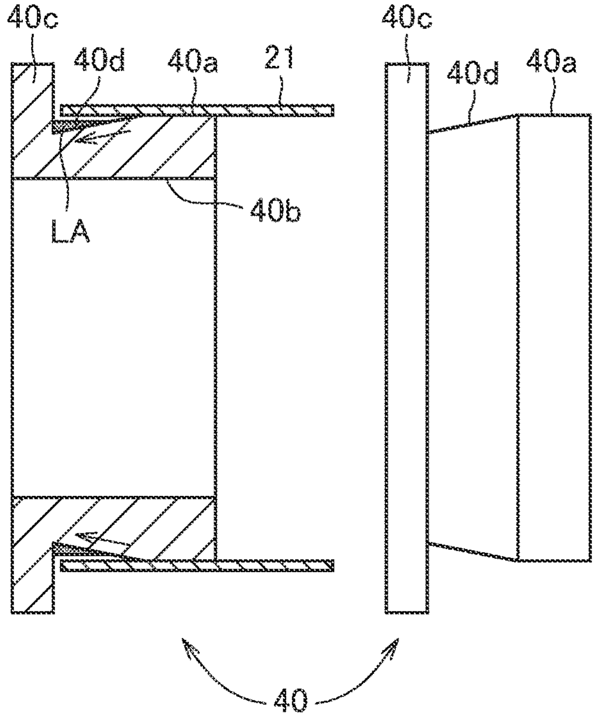
FIGS. 4A and 4B are top views and cross-sectional views of flanges according to a first embodiment.
Figure 4B:
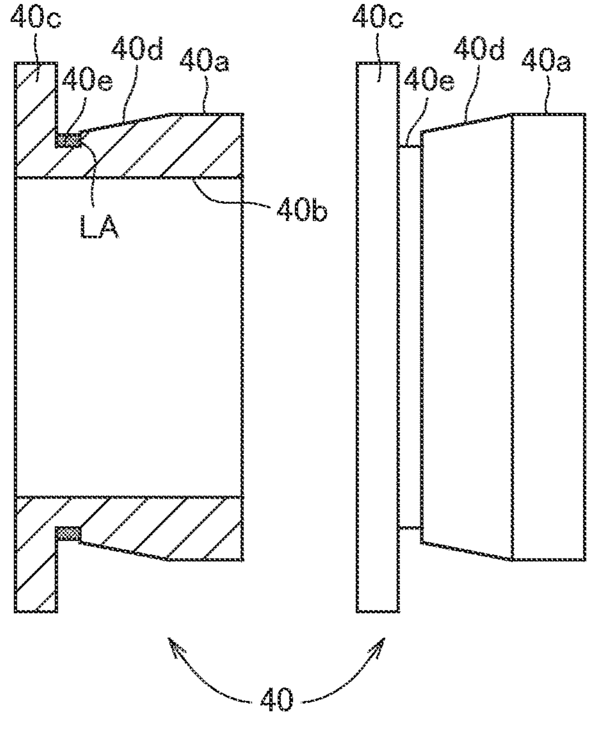

FIGS. 4A and 4B are top cross-sectional views and top views of the flange 40 and the fixing belt 21. As illustrated in FIG. 4A, the flange 40 includes a cylindrical portion 40*a* having an inner peripheral surface 40*b* and a flange portion 40*c*. The cylindrical portion 40*a* serves as a holding portion. The cylindrical portions 40*a* are in contact with both ends of the inner peripheral surface of the fixing belt 21, and the inner peripheral surface of the fixing belt 21 slides on the cylindrical portions 40*a*. The flange portion 40*c* extends outward in a radial direction of the loop of the fixing belt that is a direction orthogonal to the longitudinal direction of the fixing belt 21. Both ends of the fixing belt 21 in the longitudinal direction are sandwiched by the flange portions 40*c*. In the present specification, the longitudinal direction is a longitudinal direction of a general fixing belt and is a rotation axis direction of the fixing belt. In FIG. 4A, the longitudinal direction is a direction parallel to the fixing belt.

The flange portion 40*c* has a portion orthogonal to the longitudinal direction of the fixing belt 21. In an upper portion of the top cross-sectional view of FIG. 4A, the flange 40 has a substantially L shape. The vertical portion of the L shape is the flange portion 40*c*, and the horizontal portion of the L shape is a portion of the flange supporting the end of the fixing belt 21. Lubricant LA is applied to the cylindrical portion 40*a* of the flange 40 so that the fixing belt 21 smoothly slides on the cylindrical portion 40*a*.

The flange 40 has an inclined surface 40*d* between the cylindrical portion 40*a* and the flange portion 40*c*. The inclined surface 40*d* is inclined in a direction away from the inner peripheral surface of the fixing belt 21 facing the inclined surface 40*d* from the cylindrical portion 40*a* toward the flange portion 40*c*. The inclined surface 40*d* has a point adjacent to the flange portion 40*c* and farther from the inner peripheral surface than another point adjacent to the cylindrical portion 40*a*. In other words, the closer a point on the inclined surface 40*d* is to the flange portion 40*c*, the farther the point on the inclined surface 40*d* is from the inner peripheral surface of the fixing belt 21. That is, a diameter of a circle formed by the inclined surface 40*d* decreases outward in the longitudinal direction. The inclined surface 40*d* forms a space as a lubricant reservoir to store the lubricant LA. The lubricant LA may be in a liquid state, a semi-solid state, or a mixture thereof. The "liquid state" is a colloidal sol in which a solid is contained in a liquid, and the "semi-solid state" is a gel in which the sol is solidified in a jelly state.

The inclination angle θ of the inclined surface 40*d* with respect to the longitudinal direction may be set in a range of 3° to 8°, for example. The inclined surface 40*d* may be a conical surface formed from an outer end of the cylindrical portion 40*a* in the longitudinal direction toward the flange portion 40*c*.

The length of the inclined surface 40*d* in the longitudinal direction is set, for example, to be 8 mm. The farthest portion of the inclined surface 40*d* from the outer surface of the cylindrical portion 40*a* in a direction orthogonal to the longitudinal direction may be set to be away from the outer surface of the cylindrical portion 40*a* by, for example, 0.5 mm to 1 mm.

The thickness of the farthest portion described above may be set in a range of 1.1 mm to 1.5 mm, for example. The thickness of the flange 40 is a length from the inner peripheral surface 40*b* to an outer surface of the flange 40 in the radial direction of the loop of the fixing belt 21 orthogonal to the longitudinal direction of the fixing belt 21 as the rotator. According to results of temperature measurement illustrated in FIG. 5A, which is described below, setting the thickness of the farthest portion to 1.1 mm or more can suppress the temperature rise at the farthest portion to 200° C. or less.

As illustrated in FIG. 4B, the flange 40 may have a circumferential annular groove 40*e* formed between the farthest portion of the inclined surface 40*d* and the base of the flange portion 40*c*. The annular groove 40*e* increases the space as the lubricating reservoir to store the lubricant LA. Setting the thickness from the inner peripheral surface 40*b* to the bottom of the annular groove 40*e* to 1.1 mm or more can suppress the temperature rise at the bottom to 200° C. or less.

A second embodiment is described below with reference to FIGS. 4C and 4D.

Figure 4C:
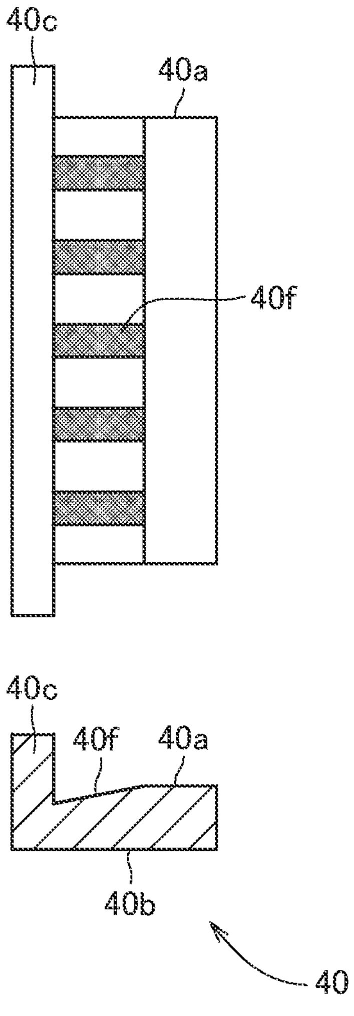
FIGS. 4C and 4D are top views and cross-sectional views of flanges according to a second embodiment.
Figure 4D:
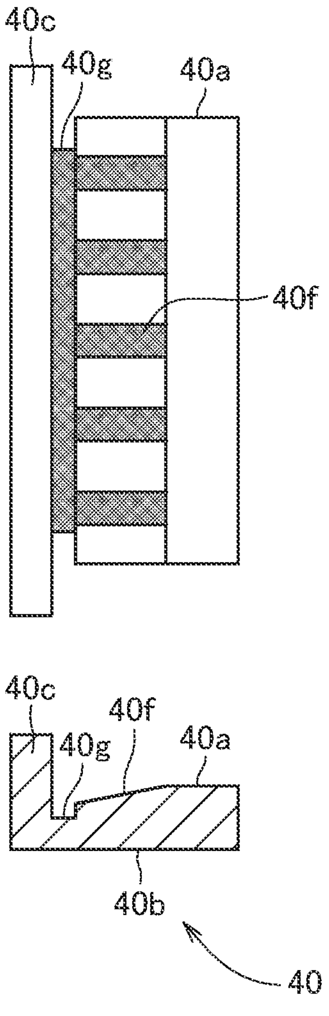

As illustrated in FIGS. 4C and 4D, the flange 40 according to the second embodiment has a plurality of inclined grooves 40*f*. The inclined groove has a bottom surface that is the inclined surface as illustrated in FIGS. 4A and 4B. The inclined groove 40*f* extends between the cylindrical portion 40*a* and the flange portion 40*c* in the longitudinal direction of the fixing belt 21. The plurality of inclined grooves 40*f* are formed at equal intervals in the circumferential direction of the cylindrical portion 40*a*. In other words, the plurality of inclined grooves 40*f* is arranged in a rotation direction of the fixing belt 21.

In FIG. 4C, an outer end of the inclined groove 40*f* in the longitudinal direction is connected to the base of the flange portion 40*c*. In FIG. 4D, the outer end of the inclined groove 40*f* in the longitudinal direction is connected to an annular groove 40*g*. A portion between the inclined grooves 40*f* is not inclined and extends from the cylindrical portion 40*a* in the longitudinal direction of the fixing belt. Portions between the inclined grooves 40*f* form a comb-tooth shape.

A third embodiment is described below with reference to FIGS. 4E and 4F.

Figure 4E:
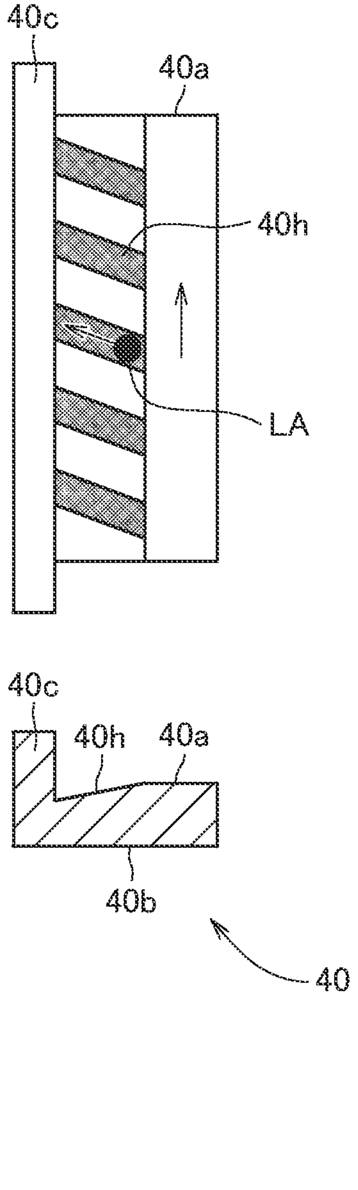
FIGS. 4E and 4F are top views and cross-sectional views of flanges according to a third embodiment.
Figure 4F:
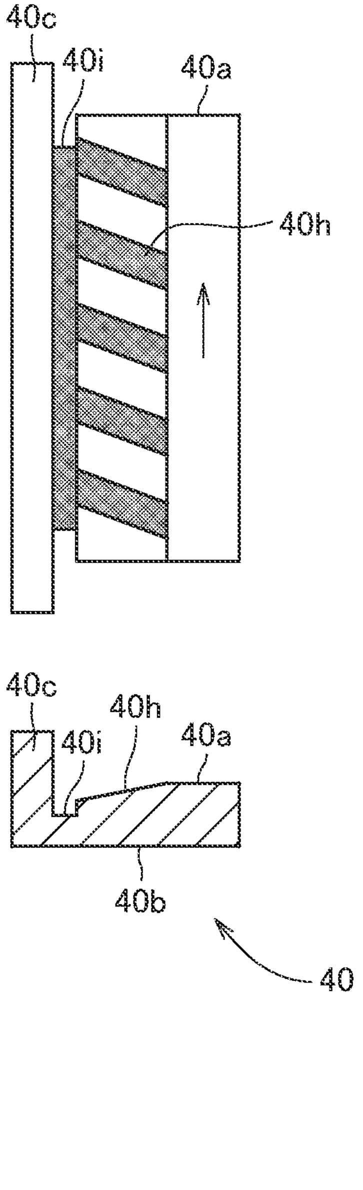

As illustrated in FIGS. 4E and 4F, the flange 40 according to the third embodiment has spiral inclined grooves 40*h* instead of the inclined grooves 40*f* as illustrated in FIGS. 4C and 4D. The spiral inclined groove 40*h* is inclined in the rotation direction of the fixing belt 21 (that is indicated by an arrow in each of FIGS. 4E and 4F) and extends toward the inner surface of the flange portion 40*c*. In addition, the spiral inclined grooves 40*h* are arranged in the rotation direction. An inclination angle of the spiral inclined groove 40*h* in the direction indicated by the arrow may be set in a range of 1° to 70°, for example. A plurality of spiral inclined grooves 40*h* are formed at equal intervals in the circumferential direction of the cylindrical portion 40*a*.

In FIG. 4E, an outer end of the spiral inclined groove 40*h* in the longitudinal direction is connected to the base of the flange portion 40*c*. In FIG. 4F, the outer end of the spiral inclined groove 40*h* in the longitudinal direction is connected to an annular groove 40*i*. A portion between the spiral inclined grooves 40*h* is not inclined and extends from the cylindrical portion 40*a* in the longitudinal direction of the fixing belt. Portions between the spiral inclined grooves 40*h* form the comb-tooth shape.

A fourth embodiment is described below with reference to FIG. 4G.

Figure 4G:
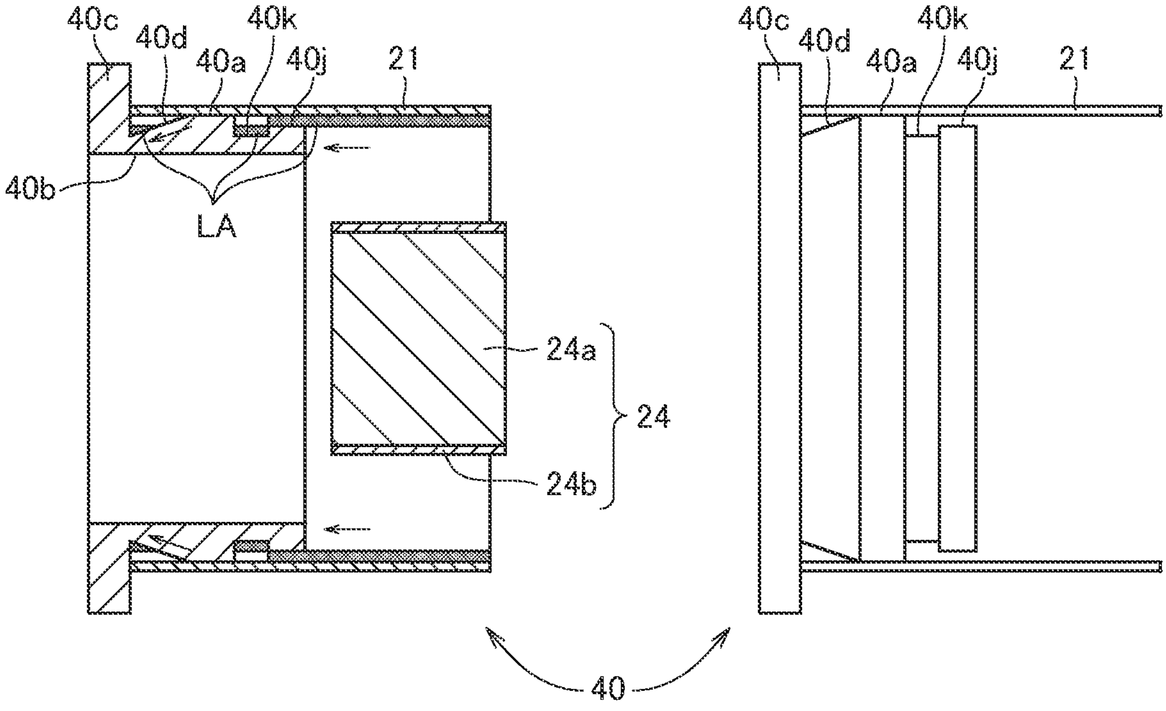
FIG. 4G is a top view and a cross-sectional view of a flange according to a fourth embodiment.

As illustrated in FIG. 4G, the flange 40 according to the fourth embodiment includes a first cylindrical portion 40*a* that is the cylindrical portion 40*a* as illustrated in FIG. 4A, a circumferential annular groove 40*k* formed on the inner side of the first cylindrical portion 40*a* in the longitudinal direction, and a second cylindrical portion 40*j* formed inside from the annular groove 40*k*. The second cylindrical portion 40*j* is smaller in diameter than the first cylindrical portion 40*a* so as to be close to the inner peripheral surface of the fixing belt 21 and not in contact with the inner peripheral surface of the fixing belt 21.

The inclined surface 40*d* forms a first lubricant reservoir, and the annular groove 40*k* forms a second lubricant reservoir. Forming two lubricant reservoirs as described above can more surely prevent the lubricant from leaking than the flange 40 configured as illustrated in FIG. 4A.

A fifth embodiment is described below with reference to FIG. 4H.

Figure 4H:
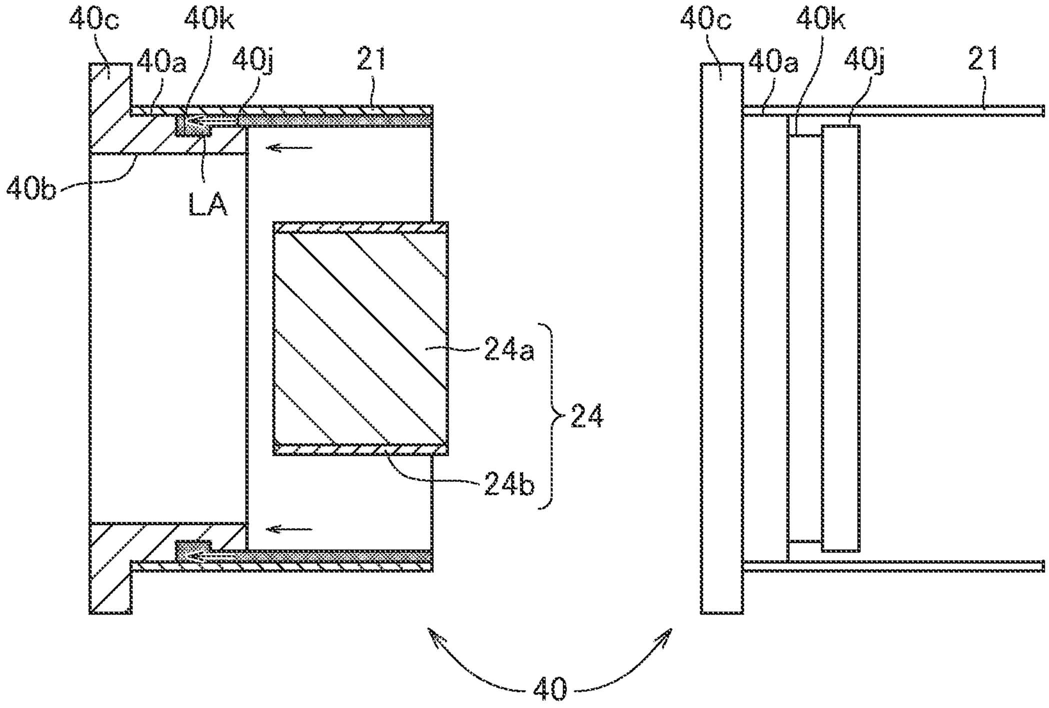
FIG. 4H is a top view and a cross-sectional view of a flange according to a fifth embodiment.

As illustrated in FIG. 4H, the flange 40 according to the fifth embodiment includes the first cylindrical portion 40*a* having the inner peripheral surface 40*b* and the flange portion 40*c*. The first cylindrical portions 40*a* are in contact with both ends of the inner peripheral surface of the fixing belt 21, and the inner peripheral surface of the fixing belt 21 slides on the cylindrical portions 40*a*. The flange portion 40*c* extends outward in the radial direction of the loop of the fixing belt that is a direction perpendicular to the rotational axis direction of the fixing belt 21. Both ends of the fixing belt 21 in the longitudinal direction are sandwiched by the flange portions.

As illustrated in FIG. 4H, the flange 40 according to the fifth embodiment has the circumferential annular groove 40*k* formed on the inner side of the first cylindrical portion 40*a* in the longitudinal direction and the second cylindrical portion 40*j* formed inside from the annular groove 40*k*. The second cylindrical portion 40*j* is smaller in diameter than the first cylindrical portion 40*a* so as to be close to the inner peripheral surface of the fixing belt 21 and not in contact with the inner peripheral surface of the fixing belt 21. The annular groove 40*k* forms the lubricant reservoir.

In the flange 40 according to the fifth embodiment in FIG. 4H, the inclined surface 40*d* is omitted from the flange 40 according to the fourth embodiment in FIG. 4G. Since the annular groove 40*k* forms the first lubricant reservoir, the inclined surface 40*d* can be omitted.

With reference to FIGS. 5A to 5D, the following describes verification results that the present embodiments can prevent the occurrence of the fine particles including the ultrafine particles.

Figure 5A:
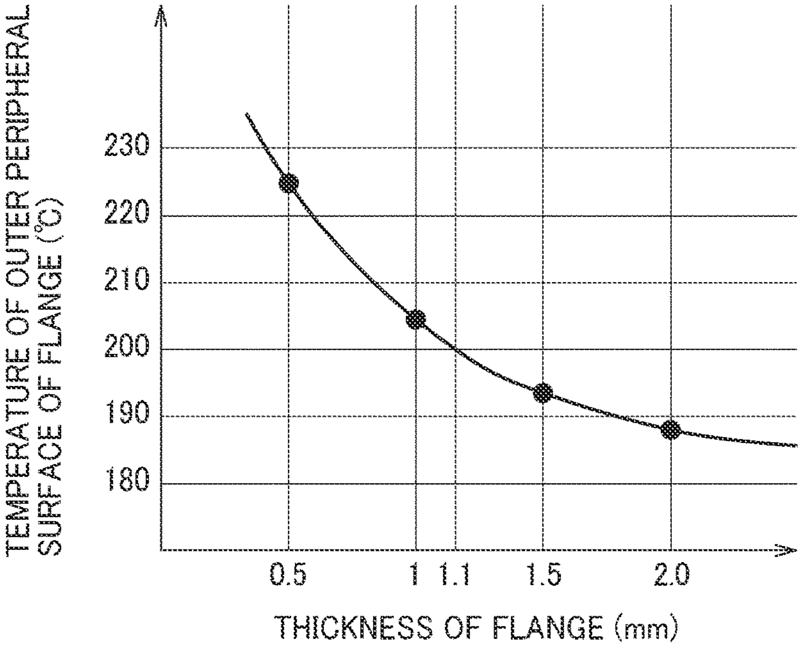
FIG. 5A is a graph illustrating a relation between a thickness of the flange and a temperature of an outer peripheral surface of the flange.

FIG. 5A is a graph illustrating a relation between a thickness of the flange 40 and a temperature of an outer peripheral surface of the flange 40. From the graph of FIG. 5A, it is understood that the temperature of the outer peripheral surface of the flange was 200° C. or less when the flange had a thickness of 1.1 mm or more.

Figure 5B:
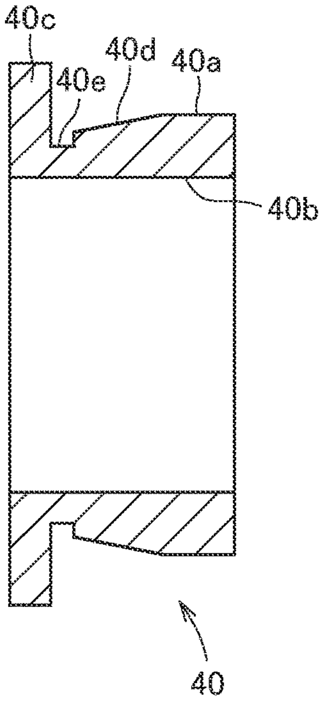
FIG. 5B is a cross-sectional view of the flange used for temperature measurements.

FIG. 5B is the cross-sectional view of the flange 40 according to the first embodiment illustrated in FIG. 4B that was used for the temperature measurements that gave the results of FIG. 5A. The flange 40 was made of a heat-resistant resin such as a liquid crystal polymer. The flange 40 had a thickness of 1.1 mm at a position of the bottom of the annular groove 40*e* at which the flange is thinnest.

Figure 5C:
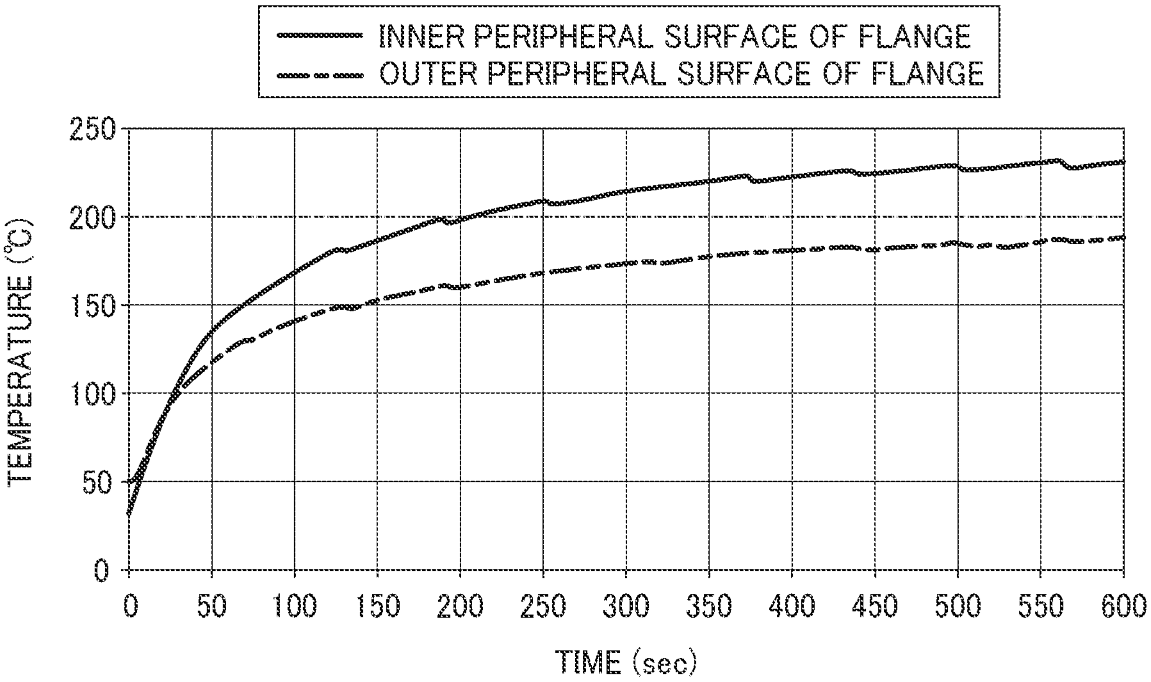
FIG. 5C is a graph illustrating a relation between an operating time of the fixing device and a temperature of an inner peripheral surface of a flange and a relation between the operating time and a temperature of an outer peripheral surface of the flange.

Similar to the above-described printing tests that gave the results of FIG. 6C, the present inventors performed the printing tests using the image forming apparatus including the above-described flange 40 illustrated in FIG. 5B. During the printing test, temperatures were measured in the inner peripheral surface and the outer peripheral surface of the flange. FIG. 5C illustrates measurement results. As can be seen from the graph in FIG. 5C, the temperature of the inner peripheral surface of the flange 40 exceeded 200° C. after continuous printing for 200 seconds, but the temperature of the outer peripheral surface of the flange 40 did not exceed 200° C. even after continuous printing for 600 seconds.

Figure 5D:
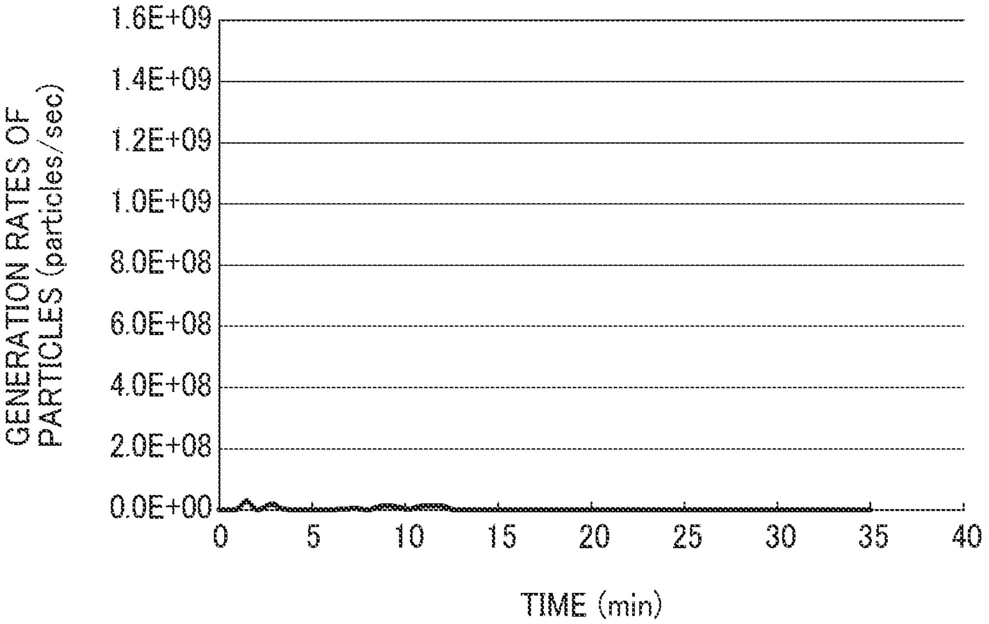
FIG. 5D is a graph illustrating a relation between the operating time of the fixing device according to the present embodiment and a generation rate of fine particles.

The present inventors performed continuous printing tests for enough time according to a measurement method adapted to the German environmental label "Blue Angel Mark" and measured generation rates (particles/sec) of the fine particles (FP) including the ultrafine particles (UFP). FIG. 5D is a graph illustrating the measurement results. The concentration of generated fine particles including the ultrafine particles was measured with a fast mobility particle sizer (FMPS3091 manufactured by Tokyo Dylec Corp.).

A fluorine grease of 70 mg and a silicone oil of 35 mg were used as the lubricant. As illustrated in the graph of FIG. 5D, it was confirmed that the fine particles including the ultrafine particles were not almost generated.

Since the standard value of the "Blue Angel Mark" is $3.5\times10^{11}$ particles per ten minutes, the measurement results illustrated in FIG. 5D is significantly lower than the standard value. This is an effect of the present embodiments that eliminate almost lubricant LA reaching the inner peripheral surface 40*b* of the flange 40 and suppress the temperatures of the outer peripheral surface of the flange 40 that is the cylindrical portion 40*a*, the inclined surface 40*d*, and the annular groove 40*e* to 200° C. or less.

The above-described embodiments are illustrative and do not limit this disclosure. It is therefore to be understood that within the scope of the appended claims, numerous additional modifications and variations are possible to this disclosure otherwise than as specifically described herein. For example, the image forming apparatus to which the features of this disclosure are applied is not limited to the printer illustrated in FIG. 1 but may be other types of printers, copiers, facsimile machines, or multifunction peripherals having these capabilities. In the above description, the embodiments of the present disclosure are applied to the fixing device incorporated in the electrophotographic image forming apparatus as illustrated in FIG. 1. However, the present disclosure is not limited to this. The embodiments of the present disclosure may be applied to a heating device other than the fixing device, such as a drying device that is included in an inkjet image forming apparatus and dries liquid such as ink applied to a sheet.

Figure 8:
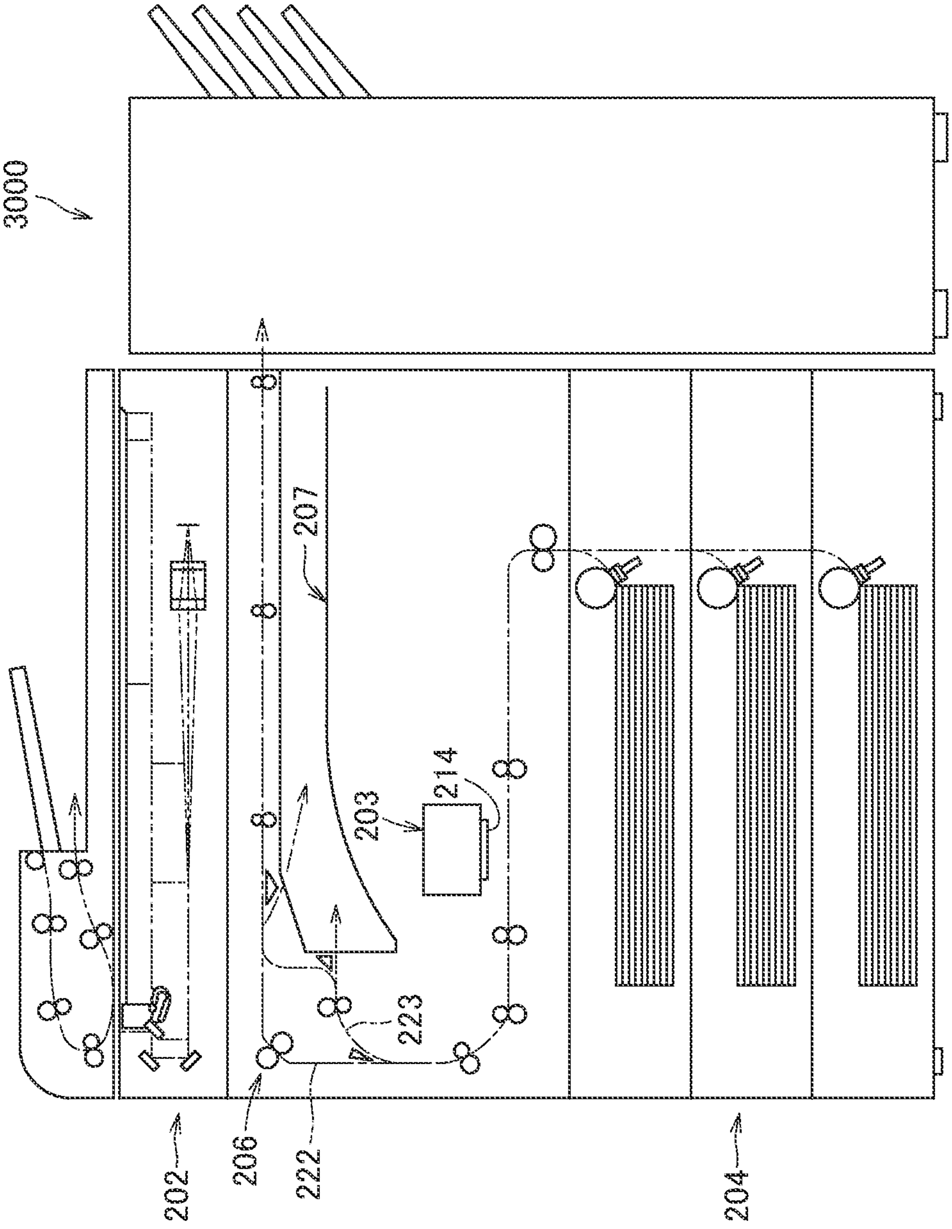
FIG. 8 is a schematic cross-sectional view of an inkjet image forming apparatus including a drying device according to an embodiment of the present disclosure.

FIG. 8 illustrates an inkjet image forming apparatus 2000 including a drying device 206 according to an embodiment of the present disclosure. The inkjet image forming apparatus 2000 illustrated in FIG. 8 includes an image reading device 202, an image forming device 203, a sheet supplying device 204, the drying device 206, and an output section 207. A sheet aligning apparatus 3000 is disposed beside the inkjet image forming apparatus 2000.

In response to an instruction to start a printing operation, the sheet supplying device 204 feeds a sheet such as a sheet of paper as a recording medium in the inkjet image forming apparatus 2000. When the sheet is conveyed to the image forming device 203, the image forming device 203 discharges ink from a liquid discharge head 214 to the sheet according to image data of a document read by the image reading device 202 or print data instructed to print by a terminal, to form an image on the sheet.

The sheet bearing the image is selectively guided to a conveyance passage 222 or a conveyance passage 223. When the sheet is guided to the conveyance passage 222, the sheet passes through the drying device 206. When the sheet is guided to the conveyance passage 223, the sheet does not pass through the drying device 206. When the sheet is guided to the drying device 206, the drying device 206 accelerates the drying of the ink on the sheet. The sheet is then guided to the output section 207 or the sheet aligning apparatus 3000. By contrast, when the sheet is guided to the conveyance passage 223 along which the sheet does not pass through the drying device 206, the sheet is directly guided to the output section 207 or the sheet aligning apparatus 3000. The sheet aligning apparatus 3000 aligns and places the sheets guided to the sheet aligning apparatus 3000.

Figure 9:
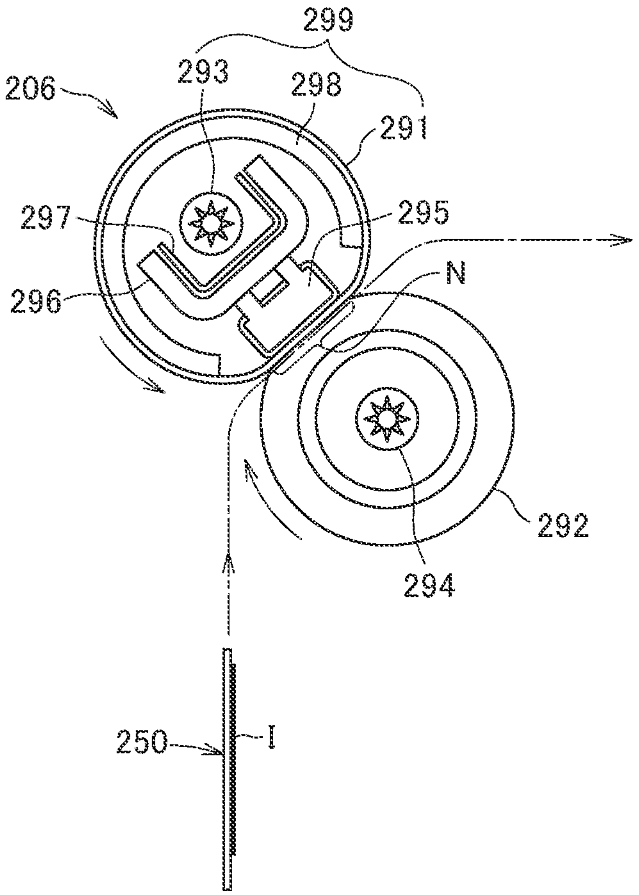
FIG. 9 is a schematic cross-sectional view of the drying device.

As illustrated in FIG. 9, the drying device 206 includes a heating belt 291 as a first rotator, a heating roller 292 as a second rotator, a first heater 293 as the heat source that heats the heating belt 291, a second heater 294 as the heat source that heats the heating roller 292, a nip formation pad 295, a stay 296 as a support, a reflector 297, and belt holders 298 as the rotator holders that hold the heating belt 291 such that the heating belt 291 can rotate. In FIG. 9, the heating belt 291, the first heater 293, and the belt holder 298 to which the lubricant is applied configure a heating device 299 of the present disclosure. The belt holder 298 may have any one of the shapes illustrated in FIGS. 4A to 4H and include the cylindrical portion 40*a*, the flange portion 40*c*, and the inclined surface 40*d*.

The nip formation pad 295 contacts an outer peripheral surface of the heating roller 292 via the heating belt 291 to form a nip N between the heating belt 291 and the heating roller 292. That is, the heating roller 292 serves as the pressure rotator to press against the nip formation pad 295 via the heating belt 291 as the rotator to form the nip N. As illustrated in FIG. 9, when a sheet 250 bearing an image, illustrated as ink I in FIG. 16, is conveyed to the nip N of the drying device 206, the sheet 250 is heated while being conveyed by the heating belt 291 and the heating roller 292 rotating in the directions indicated by arrows in FIG. 16. Thus, the drying of the ink I on the sheet 250 is accelerated.

In the drying device 206 illustrated in FIG. 9, the heating belt 291 is rotatably held by the pair of belt holders 298 disposed at both ends of the heating belt 291 in the longitudinal direction of the heating belt 291. When the heating belt 291 is heated and the temperature of the belt holders 298 rises, the fine particles including the ultrafine particles may be generated from lubricant adhering to the belt holders 298. Like the fixing devices described above, the drying device 206 according to the present embodiment prevents the temperature rise of the belt holders 298 and effectively reduces the generation of the fine particles including the ultrafine particles.

Figure 10:
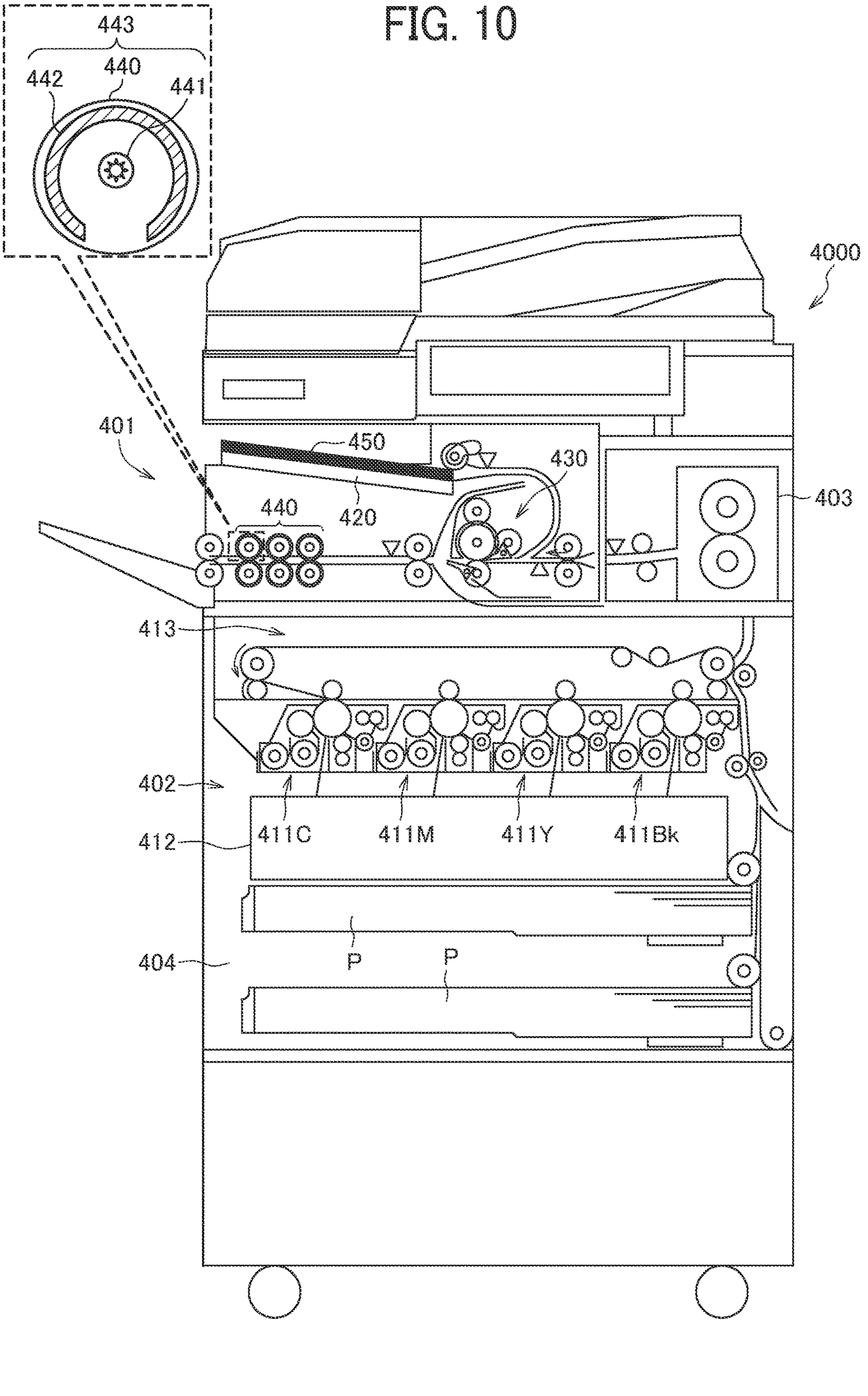
FIG. 10 is a schematic cross-sectional view of an image forming apparatus including a laminator according to an embodiment of the present disclosure and a schematic enlarged view of a heat and pressure roller included in the laminator.

The embodiments of the present disclosure are also applicable to an image forming apparatus including a laminator as illustrated in FIG. 10. An image forming apparatus 4000 that is illustrated in FIG. 10 includes a laminator 401, an image forming device 402, a fixing device 403, and a sheet feeding device 404 as a recording-medium supplier. The image forming device 402 includes a plurality of image forming units 411C, 411M, 411Y, and 411Bk, an exposure device 412, and a transfer device 413.

The laminator 401 is a heating device that applies heat and pressure to two sheets between which a recording medium is inserted, to thermally press the sheets to the recording medium. Specifically, the laminator 401 includes a sheet supplier 420, a sheet separator 430, and heat and pressure rollers 440. The sheet supplier 420 supplies a sheet 450. The sheet separator 430 separates the sheet supplied from the sheet supplier 420 into two sheets. The heat and pressure rollers 440 as rotators convey the two separated sheets between which the recording medium is inserted, while applying heat and pressure to the sheets and the recording medium. A heat source such as a heater 441 heats the heat and pressure roller 440. A pair of rotator holders such as a pair of bearings 442 rotatably holds both ends of an inner peripheral surface of the heat and pressure roller 440 in the longitudinal direction of the heat and pressure roller 440. All heat and pressure rollers 440 illustrated in FIG. 10 each include the heater 441 and the pair of bearings 442 as illustrated in an enlarged view of the heat and pressure roller 440 in FIG. 10. In FIG. 10, the heating device 443 according to the present disclosure is configured by the heat and pressure roller 440 as the rotator, the heater 441, and the bearing 442 to which the lubricant is applied. The bearing 442 may have any one of the shapes illustrated in FIGS. 4A to 4H and include the cylindrical portion 40*a*, the flange portion 40*c*, and the inclined surface 40*d*.

In the image forming apparatus 4000 illustrated in FIG. 10, when a sheet P as a recording medium is supplied from the sheet feeding device 404 to the image forming device 402, the image forming device 402 forms an image and transfers the image onto the supplied sheet P. The sheet P bearing the transferred image is conveyed to the fixing device 403, which fixes the image onto the sheet P. The image forming and transfer processes performed by the image forming device 402 with the plurality of image forming units 411C, 411M, 411Y, and 411Bk, the exposure device 412, and the transfer device 413 are basically the same as those described in the above embodiment. The fixing process performed by the fixing device 403 is basically the same as that described in the above embodiment. Therefore, a redundant description thereof is omitted.

The sheet P subjected to the fixing process is then conveyed to the laminator 401 and inserted between two sheets separated from each other. Then, the heat and pressure rollers 440 apply heat and pressure to the sheet P sandwiched between the two sheets to thermally press the sheets and the sheet P. The sheets and the sheet P thus thermally pressed are ejected to the outside of the image forming apparatus 4000.

When the heat and pressure roller 440 is heated by the heat source such as the heater 441 and the temperature of the bearings supporting the heat and pressure roller 440 rises, the fine particles including the ultra fine particles may be generated from the lubricant adhering to the bearings. Like the fixing devices and the drying device described above, the laminator 401 including the heat and pressure rollers 440 according to the present embodiment prevents the temperature rise of the bearings that hold the heat and pressure rollers 440 and effectively reduces the generation of the fine particles including the ultrafine particles.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:

a rotator;

a heater configured to heat an inner peripheral surface of the rotator;

a rotator holder configured to hold an end of the inner peripheral surface of the rotator in a longitudinal direction of the rotator, the rotator holder including, a holding portion in contact with the end of the inner peripheral surface of the rotator such that the end of the inner peripheral surface of the rotator is slidable on the holding portion;

a flange portion being in contact with an end of the rotator in the longitudinal direction and extending outward in a radial direction of a loop of the rotator;

an inclined surface inclined in a direction away from the inner peripheral surface of the rotator facing the inclined surface from the holding portion toward the flange portion, a distance between the inclined surface and the inner peripheral surface of the rotator increasing as a distance between the inclined surface and the flange portion decreases; and a lubricant reservoir configured to store a lubricant and apply the lubricant on the rotator holder, the lubricant reservoir between the inclined surface and the rotator, the lubricant configured to be in a liquid state or a semi-solid state.

2. The heating device according to claim 1, wherein the rotator holder has a thickness of 1.1 mm or more in the radial direction orthogonal to the longitudinal direction of the rotator.

3. The heating device according to claim 1, wherein the rotator holder includes an inclined groove having a bottom surface that is the inclined surface.

4. The heating device according to claim 3, wherein the rotator holder includes a plurality of inclined grooves arranged in a rotation direction of the rotator, the plurality of inclined grooves including the inclined groove.

5. The heating device according to claim 4, wherein the plurality of inclined grooves are located at equal intervals in a circumferential direction of the holding portion.

6. The heating device according to claim 3, wherein the inclined groove is a spiral inclined groove.

7. The heating device according to claim 6, wherein
the rotator holder includes a plurality of spiral inclined grooves, the plurality of spiral inclined grooves including the spiral inclined groove; and
each of the plurality of spiral inclined grooves is on an outer peripheral surface of the rotator holder and inclined in a rotation direction of the rotator toward an inner surface of the flange portion.

8. The heating device according to claim 6, wherein the plurality of spiral inclined grooves are located at equal intervals in a circumferential direction of the holding portion.

9. The heating device according to claim 1, wherein the rotator holder includes a groove between the holding portion and a base of the flange portion.

10. A nip forming device comprising:
the heating device according to claim 1;
a nip formation pad in contact with the inner peripheral surface of the rotator; and
a pressure rotator configured to press against the nip formation pad via the rotator to form a nip,
wherein the rotator and the pressure rotator are configured to convey a conveyed object passing through the nip.

11. A fixing device comprising:
the nip forming device according to claim 10,
wherein the rotator and the pressure rotator are configured to convey a recording medium bearing a toner image and passing through the nip to fix the toner image onto the recording medium.

12. An image forming apparatus comprising:
an image forming device configured to form an image; and
the heating device according to claim 1.

13. A heating device comprising:
a rotator;
a heater configured to heat an inner peripheral surface of the rotator;
a rotator holder configured to hold an end of the inner peripheral surface of the rotator in a longitudinal direction of the rotator, the rotator holder including;
a first holding portion in contact with the end of the inner peripheral surface of the rotator such that the end of the inner peripheral surface of the rotator is slidable on the holding portion;
a flange portion being in contact with an end of the rotator in the longitudinal direction and extending outward in a radial direction of a loop of the rotator;
an inclined surface inclined in a direction away from an inner peripheral surface of the rotator facing the inclined surface from the first holding portion toward the flange portion, a distance between the inclined surface and the inner peripheral surface of the rotator increasing as a distance between the inclined surface and the flange portion decreases;
a circumferential annular groove inside the first holding portion in the longitudinal direction; and
a second holding portion inside the annular groove in the longitudinal direction, the second holding portion being adjacent to the inner peripheral surface of the rotator and not in contact with the inner peripheral surface of the rotator; and
a lubricant reservoir configured to store a lubricant and apply the lubricant on the rotator holder, the lubricant reservoir between the inclined surface and the rotator, the lubricant configured to be in a liquid state or a semi-solid state.

14. A nip forming device comprising:
the heating device according to claim 13;
a nip formation pad in contact with the inner peripheral surface of the rotator; and
a pressure rotator configured to press against the nip formation pad via the rotator to form a nip,
wherein the rotator and the pressure rotator are configured to convey a conveyed object passing through the nip.

15. An image forming apparatus comprising:
an image forming device configured to form an image; and
the heating device according to claim 13.

16. The heating device according to claim 13, wherein the rotator holder includes an inclined groove having a bottom surface that is the inclined surface.

17. A heating device comprising:
a rotator;
a heater configured to heat an inner peripheral surface of the rotator;
a rotator holder configured to hold an end of the inner peripheral surface of the rotator in a longitudinal direction of the rotator, the rotator holder including,
a first holding portion in contact with the end of the inner peripheral surface of the rotator such that the end of the inner peripheral surface of the rotator is slidable on the holding portion;
a flange portion being in contact with an end of the rotator in the longitudinal direction and extending outward in a radial direction of a loop of the rotator;
a circumferential annular groove inside the first holding portion in the longitudinal direction;
a second holding portion inside the annular groove in the longitudinal direction, the second holding portion being adjacent to the inner peripheral surface of the rotator and not in contact with the inner peripheral surface of the rotator; and
a lubricant reservoir configured to store a lubricant and apply the lubricant on the rotator holder, the lubricant reservoir between an inclined surface and the rotator, the lubricant configured to be in a liquid state or a semi-solid state.

18. A nip forming device comprising:
the heating device according to claim 17;
a nip formation pad in contact with the inner peripheral surface of the rotator; and
a pressure rotator configured to press against the nip formation pad via the rotator to form a nip,
wherein the rotator and the pressure rotator are configured to convey a conveyed object passing through the nip.

19. An image forming apparatus comprising:

an image forming device configured to form an image; and the heating device according to claim 17.

20. The heating device according to claim 17, further comprising:

the inclined surface inclined in a direction away from an inner peripheral surface of the rotator facing the inclined surface from the first holding portion toward the flange portion, a distance between the inclined surface and the inner peripheral surface of the rotator increasing as a distance between the inclined surface and the flange portion decreases; and the rotator holder includes an inclined groove having a bottom surface that is the inclined surface.

* * * * *